United States Patent Office 3,431,360
Patented Mar. 4, 1969

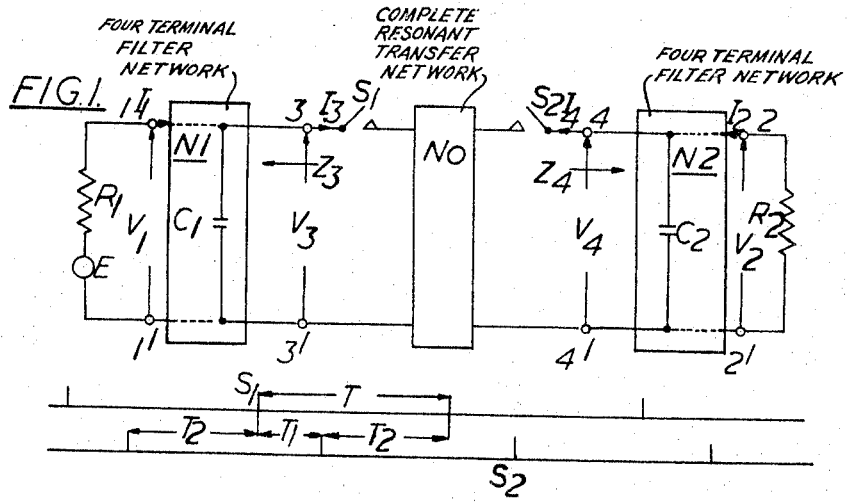
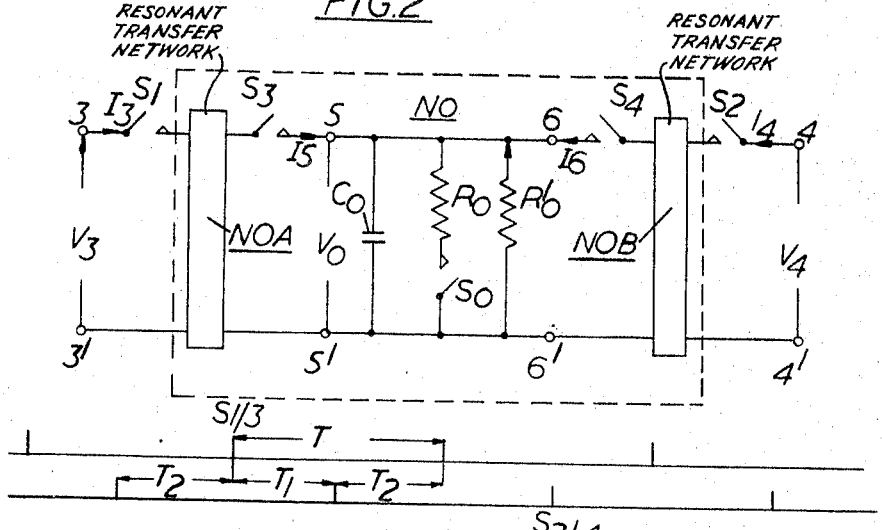
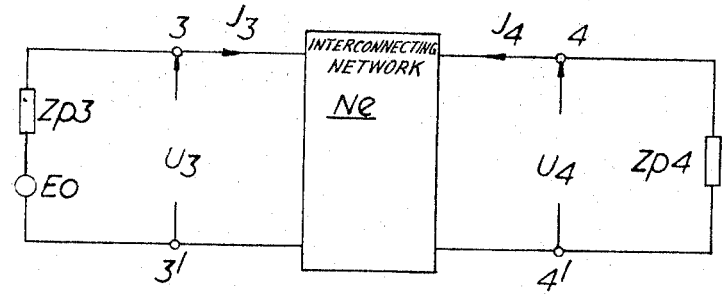

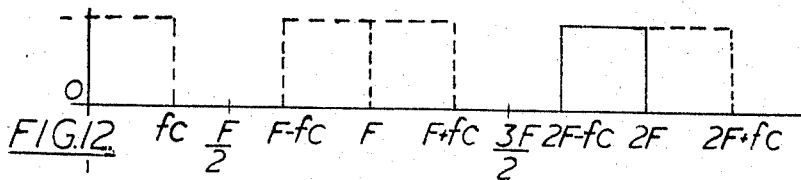
FIG.12. $f_c$ $\frac{F}{2}$ $F-f_c$ $F$ $F+f_c$ $\frac{3F}{2}$ $2F-f_c$ $2F$ $2F+f_c$
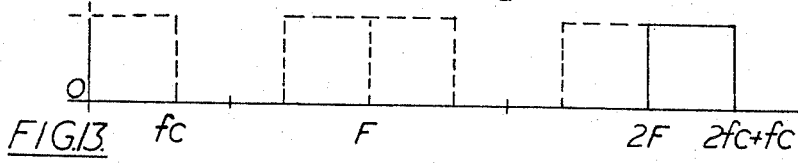
FIG.13. $f_c$ $F$ $2F$ $2f_c+f_c$
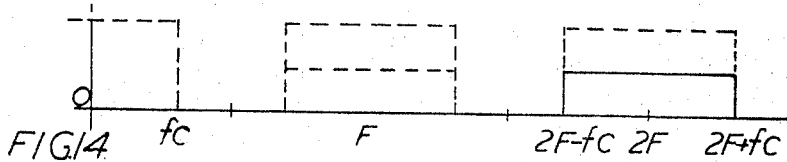
FIG.14. $f_c$ $F$ $2F-f_c$ $2F$ $2F+f_c$
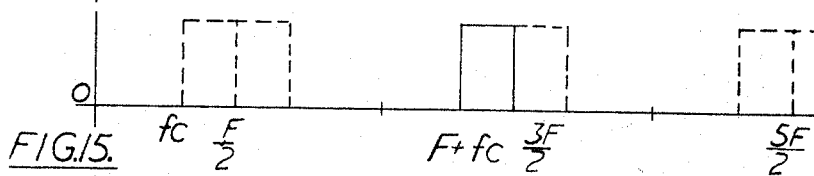
FIG.15. $f_c$ $\frac{F}{2}$ $F+f_c$ $\frac{3F}{2}$ $\frac{5F}{2}$
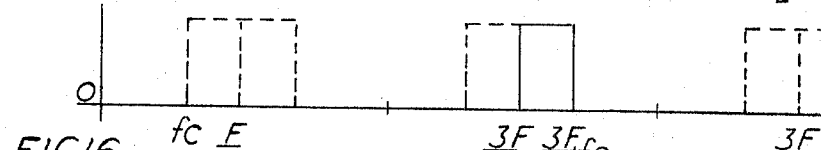
FIG.16. $f_c$ $\frac{F}{2}$ $\frac{3F}{2}$ $\frac{3F}{2}+f_c$ $\frac{3F}{2}$
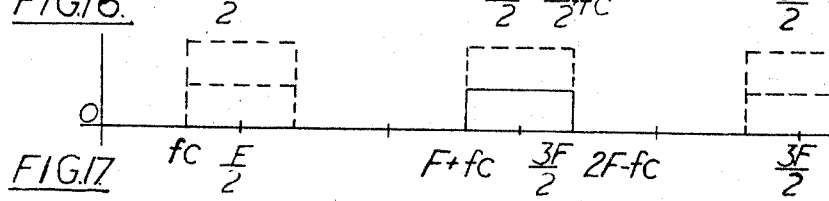
FIG.17. $f_c$ $\frac{F}{2}$ $F+f_c$ $\frac{3F}{2}$ $2F-f_c$ $\frac{3F}{2}$
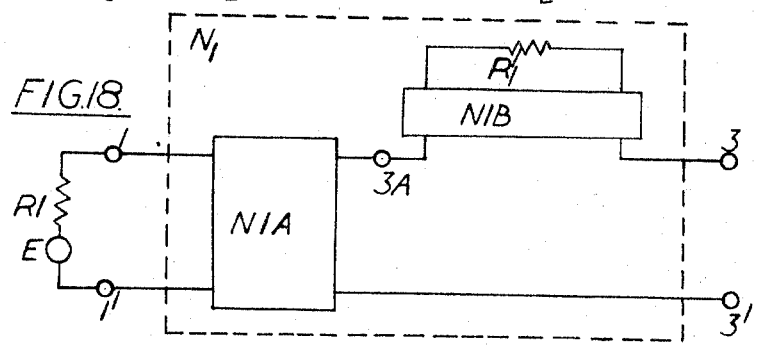
FIG.18.

3,431,360
RESONANT TRANSFER FILTERS WITH IMPEDANCE COMPENSATING FILTERS FOR FILTER CUT-OFFS UNEQUAL TO ONE-HALF OF THE SAMPLING FREQUENCY
Alfred Leo Maria Fettweiss, Mol, Belgium, assignor to International Standard Electric Corporation
Filed Nov. 16, 1964, Ser. No. 411,316
Claims priority, application Netherlands, Nov. 20, 1963, 300,746
U.S. Cl. 179—15    18 Claims
Int. Cl. H04j 1/00

ABSTRACT OF THE DISCLOSURE

Resonant transfer circuits including filters that are designed to have pulse impedance that is substantially constant within the passband. The cut-off frequencies of filters are distinct from half the sampling frequency and the pulse impedance of at least one of the filters involved in the resonant transfer circuitry is substantial purely resistant and a constant at frequencies inside and outside the passband.

---

The invention relates to resonant transfer circuits including filters so designed that their pulse impedance is substantially constant within their passband, said pulse impedance being defined as the summation of $Z(p+nP)$ over all integral positive and negative values of $n$ where $Z(p)$ is the open circuit input impedance of the corresponding filter on the side of the gates or switches used in the resonant transfer, $p$ the imaginary angular frequency and $P$ the imaginary angular sampling frequency.

Resonant transfer circuits including filters of this type and more particularly low-phase filters having a cut-off frequency equal to half the sampling frequency are known from PIEE, September 1958, volume 105, part B, page 449, etc., "Efficiency and Reciprocity in Pulse-Amplitude Modulation," K. W. Cattermole. Filters having such a property but whose cut-off frequency is not equal to half the sampling frequency are also known from the filters such as those invented by the inventor herein and covered in United States Patent No. 3,303,438, which issued Feb. 7, 1967. Therein, what is now called above the pulse impedance of the resonant transfer filter was identified as the average pulse sequence impedance corresponding to the arithmetic mean of the pulse sequence impedance functions introduced in the first above reference and obtained by sampling the waveform immediately before and after the gate unblocking pulses. These pulse sequence impedance functions, i.e., the functions $G$ and $G_1$ of the above article (see also Equations 17 and 18 of this first reference) did not actually have the dimensions of an impedance and to obtain the above identified pulse impedance, these two functions should be added to one another and multiplied by $T/2$ representing half the sampling period. The above pulse impedance is a convenient function to analyze the transmission properties of resonant transfer circuits as already evidenced by the second above mentioned reference. It can be shown that whereas an impedance $Z(p)$ representing for instance the impedance of a resonant transfer circuit filter seen from the high frequency or gate side, is an analytical function of $p$ the imaginary angular frequency, or what amounts to the same thing, an analytical function of the dimensionless variable $pT/2$, the pulse impedance $Z_p$ is an analytical function of a transformed variable $\tanh pT/2$ which is equal to $j \tan \omega T/2$.

As long as the cut-off frequency of a low-pass filter used in resonant transfer circuits is equal to half the sampling frequency, as shown by the above article the input impedance $Z(p)$ of the filter offered on the high frequency or gate side will be purely resistive and constant over the passband so that an ideal lossless transmission is achieved. In the second above mentioned reference the case of filters whose cut-off frequencies are not equal to half the sampling frequency have been analyzed. Such filters can generally be assumed to be ideal open circuit filters and when they are well designed their input impedance is of the minimum reactance type. Then, for such an ideal open circuit filter having a cut-off frequency lower than half the sampling frequency, if its input impedance $Z(p)$ has a real part which is constant as long as the absolute value of the frequency is lower than the cut-off frequency, the imaginary component of this input-impedance can be calculated by using Bode's relation between the real and imaginary parts of a minimum reactance type function. In this manner, as disclosed in the second above mentioned reference the normalized input impedance $Z(p)$ of such an ideal open circuit low-pass filter within the passband can be expressed as $$1 - \frac{j}{\omega} \log_e \frac{1+b}{1-b}$$

The normalization of this input impedance $Z(p)$ is made with respect to the constant resistance R in the passband so that the normalized input impedance $Z(p)=Z(p)/R$ and the parameter $b$ is (as disclosed by Equation 15 of the second above mentioned reference) a normalized transformed variable such that it is equal to $$\frac{\tan \frac{\omega T}{2}}{\tan \frac{\omega_c T}{2}}$$

whose denominator is the transformed variable at the cut-off frequency. It will be clear from this expression that if as assumed in the above mentioned article the cut-off frequency of the low-pass filter is exactly half the sampling frequency, then $\omega_c T = \pi$ and accordingly the normalized pulse impedance of the filter becomes unity. This becomes true at any frequency and explains why an ideal transmission without any losses can then be secured. If the cut-off frequency is lower than half the sampling frequency however, there remains within the passband, i.e., below the angular cut-off frequency $\omega_c$, the reactive term $$-\frac{j}{\pi} \log_e \frac{1+b}{1-b}$$

for the normalized pulse impedance and beyond the cut-off frequency, where the resistive part of the pulse impedance is zero there remains a reactive component $$-\frac{j}{\pi} \log_e \frac{b+1}{b-1}$$

reactive component which also disappears when $\omega_c T = \pi$.

It was however shown in the second above mentioned reference that it was possible to realize a reactive network which when associated with such an open circuit ideal filter could produce such a compensation of its pulse impedance, and more particularly of its reactive component, that the latter may be purely resistive and constant in the passband even when the cut-off frequency is distinct from half the sampling frequency. In other words, it was shown therein that it was possible to design reactive networks so that their pulse impedance would approximate $$\frac{j}{\pi} \log_e \frac{1+b}{1-b}$$

within the passband that is to say for values of $|b|$ smaller than unity. Such compensation can be carried out with any degree of approximation depending on the number of elements used in the compensating reactive network which, for the usual case of resonant transfer circuits using capacitances as reactive storage devices, is a two-terminal reactive network to be inserted directly in series with the filter on the high frequency side, i.e., towards the gates. Already with a compensating reactive network consisting of a simple antiresonant circuit a good compensation can be secured.

However, the reactive component of the pulse impedance which has to be compensated is a transcendental function of the frequency variable whereas the reactive compensating pulse impedance is an analytical function of the frequency variable. Clearly, however good the approximation may be within the passband, i.e., for values of $|b|$ smaller than unity, when $|b|$ exceeds unity, i.e., when the frequency goes above the cut-off frequency, the match between the compensating reactive pulse impedance and the reactive part of the filter pulse impedance can no longer be secured and the pulse impedance of the overall compensated filter is not constant and purely resistive outside the passband, as in the case of an ideal low-pass filter whose cut-off frequency is exactly half the sampling frequency.

This is of no consequence in so far as the transmission is concerned, since to secure a perfect lossless transmission it is sufficient when the cut-off frequency is lower than half the sampling frequency that the pulse impedance of the (compensated) filter should be constant and purely resistive within the passband.

It can be shown however that such filters, however perfect their transmission may be, are not always adequate if amplification means are used in the resonant transfer circuits.

A general object of the invention is to realize a novel compensation of filters to be used in resonant transfer circuits having amplification and stability problems particularly in mind.

In accordance with a characteristic of the invention resonant transfer circuits include filters characterized in that their cut-off frequencies are distinct from half the sampling frequency and that the pulse impedance of at least one of the filters involved in a circuit is substantially purely resistive and constant at frequencies inside and outside the passband.

In accordance with another characteristic of the invention, resonant transfer circuits include at least a filter which is associated with a compensating filter so designed that its pulse impedance has a substantially complementary characteristic with regard to the pulse impedance of the uncompensated filter whereby the pulse impedance of the compensated filter is substantially purely resistive and constant inside and outside the passband.

In accordance with another characteristic of the invention, said compensating filter has a passband substantially distinct from that of the uncompensated filter through not complementary with the latter.

Thus, with such a compensating arrangement the compensated filter has a pulse impedance which is substantially resistive and constant at all frequencies just as was the case of the ideal low-pass filter of the above mentioned article wherein the cut-off frequency was exactly equal to half the sampling frequency. This result is now obtained whatever the cut-off frequency of the filter may be. Accordingly, whenever in addition to an ideal lossless transmission one wishes to secure a substantially constant and purely resistive pulse impedance at all frequencies including those outside the filter passband it will be possible to realize this even though the cut-off frequency of a practical low-pass or bandpass filter will generally have to be chosen lower than half the sampling frequency for instance in order to secure adequate attenuation for the unwanted components, e.g., lower sideband of the sampling frequency, without resorting to too complicated filter structures.

Networks compensating the input impedance of a filter and particularly complementary filters are well known in ordinary transmission circuits where such problems as those of the resonant transfer are however not considered. Accordingly, therein it is the input impedance, and not the pulse impedance whose concept originates with the repeated switching process, which must be made resistive by using such complementary filters that those frequencies that lie in the stop band of one are the pass frequencies of the other and vice-versa.

The fact that for such practical filters their pulse impedance may be maintained substantially resistive and constant at all frequencies has been found of particular significance in relation to amplification problems for resonant transfer circuits and particularly stability problems. Indeed, as will be explained more fully in the detailed part of the description, a study of the stability of a complete transmission circuit involving resonant transfer networks and amplifying means proves to be rather delicate especially when it is demanded that amplification should be obtained without causing reflections either at the input or at the output of the circuit. It can then be shown as will be explained in detail later that the overall transmission involves an expression analogous to that found in the theory of feedback amplifiers. Here, however, the gain factor is not multiplied by a feedback factor but by what may be termed a reflection factor and which is the product of two reflection coefficients one for each of the filters involved in the transmission and each depending on the relation between the pulse impedance of the corresponding filter and the constant resistance to which this pulse impedance should be equal. It can be shown that in order to secure stability this product should not enclose the point 1, i.e., in the same way as for stability of feedback amplifiers (Nyquist's theorem), and since neither of these reflection coefficients for the pulse impedances of the two filters involved in the transmission circuit can exceed unity, as long as the gain factor does not exceed unity instability cannot occur. Otherwise, especially when one bears in mind that the phase of the two reflection factors is usually difficult to control, it is desirable that the amplitude of such reflection factors should not exceed a given maximum lower than unity, and this at any frequency, especially where the gain factor exceeds unity. In this way, it will be possible to achieve unconditionally stable gains larger than unity. The smaller will be this maximum value for the product of the two pulse impedance reflection factors, the larger will be the stable gain. Hence, if for at least one of the two filters involved in the transmission circuit it is possible to achieve a pulse impedance which is purely resistive and constant at all frequencies, in principle an ideal infinite gain can be achieved without instability. In practice, the closer the pulse impedance of the filters, or of at least one of the two filters, will be matched to a pure resistance inside and outside the passband, the larger will be the allowable stable gain.

In accordance with yet another characteristic of the invention, the resistive component of the input impedance of the uncompensated filter decreases gradually from a constant value in the passband of the uncompensated filter to zero outside the passband and the resistive component of the input impedance of the compensating filter varies likewise gradually from a constant value in the passband of the compensating filter to zero outside the passband so that tolerances causing departures from ideal conditions cannot cause the overall pulse impedance of the compensated filter to go below a minimum resistance at any frequency.

In other words filters with sloping edges can be used both for the uncompensated filter and for the compensating filter so that variations in the values of the components and shifts in the passband of the filters will nevertheless leave the overall compensated pulse impedance of the complete filter larger than a given resistance and this will permit to determine the maximum stable gain which the overall transmission circuit can tolerate.

In accordance with a further characteristic of the invention if the filter to be compensated has a given bandwidth on one or the other side of the sampling frequency or one of its harmonics, i.e., single sideband bandpass filter, including the case of a lowpass filter starting from DC as lower cut-off frequency, or has a bandwidth which extends symmetrically on both sides of the sampling frequency or one of its harmonics, i.e., double sideband bandpass filter, the compensating filter to be associated thereto has a substantially complementary bandwidth, with respect to half the sampling frequency in the case of single sideband filters, said complementary bandwidth being located on one or the other side of an odd multiple of half the sampling frequency in the case of a single sideband compensating filter or being twice as large and centered on said odd multiple of half the sampling frequency in the case of a double sideband bandpass compensating filter.

If such compensating filters which, with capacitances as energy storage devices for the resonant transfer process, will be associated in series with the filters to be compensated are assumed to be ideal open circuit filters like the filters they have to compensate, with their input impedances having a constant resistive component in their passband and no resistive component outside that passband, it can be shown that their pulse impedance is exactly complementary with respect to the pulse impedance of the uncompensated filters previously mentioned. Thus, using normalized pulse impedances also for the compensating filter, for values of $|b|$ smaller than unity the normalized pulse impedance of the compensating filter will be equal to $$\frac{j}{\pi} \log_e \frac{1+b}{1-b}$$

whereas for values of $|b|$ exceeding unity, this normalized pulse impedance of the compensating filter may be equal to $$1 + \frac{j}{\pi} \log_e \frac{1+b}{1-b}$$

showing quite clearly that whether $|b|$ is smaller or larger than unity the sum of the normalized pulse impedances of the two filters when they are put in series is always unity, i.e., at all frequencies.

In accordance with yet a further characteristic of the invention, said compensating filter consists in an antiresonant circuit shunted by a resistance the whole in series with the open circuit input impedance of the uncompensated filter.

Indeed, just as for the reactive compensating method described in the second above mentioned reference a relatively simple compensating circuit, and in any case much simpler than the original filter can usually be used with good results.

The above and other objects and characteristics of the invention as well as the invention itself will be better understood from the following description of detailed embodiments thereof to be read in conjunction with the accompanying drawings which represent:

FIG. 1, a general resonant transfer circuit including terminating resistances and useful to explain the theory on which the invention is based;

FIG. 2, the actual resonant transfer network $N_0$ shown as a block in FIG. 1 in the particular case of resonant transfer with intermediate storage;

FIG. 3, a so-called pulse impedance interconnecting circuit constituting a transposed equivalent of the actual resonant transfer circuit of FIG. 1 and useful to analyze its operation;

FIG. 4, that part of the circuit of FIG. 1 which is effective at high frequency;

FIG. 5, a circuit equivalent to the general circuit of FIG. 4 using a pair of like L-networks;

FIG. 6, a T-network equivalent to the circuit of FIG. 5;

FIG. 7, a π-network equivalent to the T-network of FIG. 6;

FIG. 8, a T-network representation of the reactive network $N_1$ appearing in FIG. 1;

FIG. 9, a T-network representation of the resistive interconnecting network $N_e$ of FIG. 3;

FIG. 10, an infinite right half-plane semicircle for the complex frequency variable $p$;

FIG. 11, a plot of the product of two reflection coefficients pertaining to the pulse impedances of the filters of FIG. 1 and useful to ascertain the stability of a resonant transfer circuit;

FIG. 12, a diagram of the resistive part of the pulse impedance of a bandpass filter shown by the aggregrate of a dotted and full outline, the latter indicating the resistive part of the input impedance of the bandpass filter with its passband below 2F, where F is the sampling frequency;

FIG. 13, a diagram similar to that of FIG. 12 but with the passband above 2F;

FIG. 14, a diagram similar to those of FIGS. 12 and 13 but covering the case of a bandpass filter for double sideband modulation and with its passband centered on 2F;

FIG. 15, a diagram corresponding to that of FIG. 12 but where the upper limit of the passband is now an odd multiple of half the sampling frequency and more particularly 3F/2;

FIG. 16, a diagram similar to that of FIG. 13 but with the passband above 3F/2;

FIG. 17, a diagram similar to that of FIG. 14, but wherein the bandpass filter for double sideband modulation has its passband now centered on 3F/2;

FIG. 18, a filter for resonant transfer in accordance with the invention;

FIG. 19, a diagram similar to that of FIG. 12 but covering particularly the case of a low-pass filter and in which the resistive component of the pulse impedance characteristic has sloping edges;

FIG. 20, a diagram showing a resistive component of the pulse impedance which is complementary to the characteristic shown in FIG. 19;

FIG. 21, a first way to realize the characteristic of FIG. 20 using a bandpass filter with its passband below $F/2$;

FIG. 22, a second way to realize the characteristic of FIG. 20 using a bandpass filter with its passband above $F/2$;

FIG. 23, a third way to realize the characteristic of FIG. 20 using a bandpass filter for double sideband modulation with its passband centered on $F/2$;

FIG. 24, a practical embodiment for the compensating resistively terminated filter network $N_{1B}$ of FIG. 18;

FIG. 25, a further practical embodiment of the filter network $N_{1B}$ of FIG. 18 to compensate a bandpass filter and FIG. 26, a modification of the network of FIG. 25.

In relation to FIGS. 1 to 9, a new general theory of resonant transfer transmisison will first be given in order to derive relevant transmission expressions which will then be used to examine the conditions for no reflection in a resonant transfer circuit.

FIG. 1 shows a general circuit serving to illustrate the resonant transfer principle which will be analyzed hereafter in order to derive a so called pulse impedance interconnecting circuit which is represented in FIG. 3, FIG. 9 representing part of the circuit of FIG. 3 which is shown therein in block diagram form. In turn, this pulse impedance interconnecting circuit will permit to calculate the transmission performance of circuits such as that of FIG. 1. This will include the determination of coefficients characterizing the reflections at terminals 1–1' and 2–2' of FIG. 1.

Thereafter, stability problems of a resonant transfer circuit will be considered, particularly in relation to FIGS. 10 and 11. Finally, the remaining figures describing filters in accordance with the invention will be discussed.

In FIG. 1, the blocks $N_1$ and $N_2$ are two 4-terminal networks which are not necessarily the same and which are the pair of terminals 3–3' for $N_1$ and on the side of the pair of terminals 4–4' for $N_2$, these two constant parameter networks $N_1$ and $N_2$ are interconnected by way of series switches, $S_1$ on the side of $N_1$ and $S_2$ on the side of $N_2$, to a network $N_0$ also shown as a block and which may in principle contain additional switches (not shown in FIG. 1) which like $S_1$ and $S_2$ are periodically operated. At its other pair of terminals 1–1', $N_1$ is fed by a source of voltage $Ee^{pt}$ having an internal resistance $R_1$. This source is represented in FIG. 1 merely by its complex amplitude E, and the factor $e^{pt}$ characterizing the frequency of the signal, $p$ being the complex angular frequency parameter and $t$ the time, is also omitted for all other voltages identified in FIG. 1, i.e., $V_1$ across terminals 1–1', $V_3$ across terminals 3–3', $V_4$ across terminals 4–4' and $V_2$ across terminals 2–2' to which is connected the load resistance $R_2$. The input impedance of $N_1$ on the side of terminals 3–3', i.e., next to the switch $S_1$, is designated by $Z_3$ and the corresponding impedance for the network $N_2$ across terminals 4–4' is designated by $Z_4$. These impedances $Z_3$ and $Z_4$ are assumed to become those of pure capacitances $C_1$ and $C_2$ when the frequency becomes sufficiently high. Accordingly, $C_1$ and $C_2$ represented inside the respective networks $N_1$ and $N_2$ by single shunt capacitors across the terminals 3–3' and 4–4' respectively, although they may be composed of a plurality of capacitors included in $N_1$ and $N_2$, may be identified in terms of $Z_3$ and $Z_4$ which are respective functions of $p$ by $$C_1 = \lim_{p \to \infty} \frac{1}{pZ_3(p)} \quad (1)$$

$$C_2 = \lim_{p \to \infty} \frac{1}{pZ_4(p)} \quad (2)$$

The network $N_0$, forming the resonant transfer network and which in its simplest form may be constituted by a single series inductance (not shown in FIG. 1) when as $C_1$ and $C_2$ as shown, will be assumed to be such that the voltages acrosst he capacitances are sharply modified during the actual resonant transfer time, e.g., during the time of closure of the switch such as $S_1$ corresponding to the capacitance $C_1$. This is obtained by a resonance phenomenon and in the case of the direct resonant transfer with the switches $S_1$ and $S_2$ closed and opened in unison, as well known, the resonant transfer time $t_1$ during which the switches are closed may be chosen equal to half the natural period of oscillation of the circuit constituted by the inductance and the capacitances $C_1$, $C_2$ in series. If this transfer time $t_1$ is sufficiently small with respect to the repetition period T, it can be justifiably assumed that any other current or voltage in the networks $N_1$ and $N_2$ remain practically unchanged during each such brief interconnecting time.

FIG. 1 also shows the times at which the switches $S_1$ and $S_2$ are operated. The recurrence period of the closures is the same for both switches and equal to T but as shown in the timing diagram of FIG. 1, the switch $S_2$ is closed at times which lag by $T_1$ behind the times of closure of the switch $S_1$ or alternatively which lead such closure times by $T_2$, so that $T = T_1 + T_2$.

This is a general timing diagram for the switches $S_1$ and $S_2$ and in fact it corresponds to a resonant transfer circuit using the intermediate storage principle also described for instance in the article previously referred to and more particularly under paragraph (5.4). In a direct resonant transfer circuit, the times of closure of the switches $S_1$ and $S_2$ will coincide so that one of the times such as $T_1$ will be equal to 0 while $T_2$ will be equal to T the repetition period. If intermediate storage is used however, the network $N_0$ may contain additional reactive storage elements as well as additional switches.

FIG. 2 shows how such a network $N_0$ may be decomposed when using the intermediate storage principle. As shown within a dotted outline, the resonant transfer network $N_0$ connected between the switches $S_1$ and $S_2$ is now decomposed into two resonant transfer networks $N_{0A}$ and $N_{0B}$ which are on the one hand connected to the terminals 3–3' through switch $S_1$ and to terminals 4–4' through switch $S_2$ respectively, and on the other hand interconnected via additional serial swtiches $S_3$ and $S_4$. Serial switch $S_3$ leads to terminal 5 which is directly interconnected with terminal 6 to which switch $S_4$ is connected. The networks $N_{0A}$ and $N_{0B}$ are further connected on the inside to terminals 5' and 6' respectively, which terminals are also directly interconnected. Between the joint terminal 5, 6 and the joint terminal 5', 6' is an intermediate storage capacitor $C_0$ which is shunted by a resistance $R'_0$ and which represents a leakage resistance. This permits to take into account variations of potential across capacitor $C_0$ when both the switches $S_3$ and $S_4$ are open as shown. Further, by means of the additional switch $S_0$, a further resistance identified by $R_0$ may be coupled across $C_0$ when switch $S_0$ is closed. This further resistance $R'_0$ is not necessarily present in an intermediate storage arrangement but as disclosed in the U.S. Patent No. 3,187,100 it may be constituted by a negative resistance which will help to keep a constant voltage across capacitor $C_0$ during the time intervals when both switches $S_3$ and $S_4$ are open, or even enable an increase of the voltage $V_0$ across $C_0$ in order to secure amplification. The leakage resistance $R'_0$ shown directly connected across $C_0$ in FIG. 2 is generally quite high so that during the intervals of time for which switch $S_0$ is closed the combined parallel resistance across $C_0$ will thus be practically equal to $R_0$ only. At other times, when switch $S_0$ is open, the resistance $R'_0$ can usually be disregarded as sufficiently high.

In the network of FIG. 2, the resonant transfer networks $N_{0A}$ and $N_{0B}$ will respectively permit a direct resonant transfer between the capacitance $C_1$ of FIG. 1 and the intermediate storage capacitor $C_0$ (FIG. 2), and between the latter and the capacitance $C_2$ of FIG. 1. The first case will happen when both switches $S_1$ and $S_3$ are closed simultaneously and the second will take place when both the switches $S_4$ and $S_2$ are closed simultaneously at times which differ from the closure times of the first two switches.

As in FIG. 1, FIG. 2 also shows a timing diagram for such closures and again, the closure times of the switches $S_{2/4}$ lag by $T_1$ behind the closure times of the switches $S_{1/3}$. During at least part of the times $T_1$ and $T_2$, the shunt switch $S_0$ may be closed, e.g., to introduce during repetitive fixed time intervals a resistance $R_0$ of negative value across capacitor $C_0$. It will be noted of course that such times of closure of the switch $S_0$ must not be deemed infinitely short as the time of closures of the switches such as $S_{1/3}$ and $S_{2/4}$. Further, modification of the voltage $V_0$ across intermediate storage capacitor $C_0$ may also occur when switch $S_0$ is closed by a resonant transfer as also disclosed in the U.S. Patent No. 3,187,100.

A general analysis of the circuit of FIG. 1 will now be made, without at first specifying a particular mode of operation, i.e., direct transfer (simultaneous closure of $S_1$ and $S_2$) or intermediate storage transfer (separate closures of $S_1$ and $S_2$).

In what follows, it is assumed that both transfer times, i.e., times of closure of the switches $S_1$ and $S_2$ are infinitely short. With $V_3$ and $V_4$ representing the voltages across $Z_3$, i.e., $C_1$, and $Z_4$, i.'e., $C_2$, respectively, the voltages $V_{3b}$ and $V_{4b}$ may be used to identify the corresponding voltages just before the closure of the respective switches $S_1$ and $S_2$, while $V_{3a}$ and $V_{4a}$ may be used to identify the respective voltages immediately after the closures of the switches $S_1$ and $S_2$. Assuming that the elements of the circuit of FIG. 1 and particularly those of the actual resonant transfer network $N_0$ are linear, from a formal viewpoint, the resonant transfer arrangement may be taken mathematically as a means to realize two linear homogeneous independent relations between the magnitudes $V_{3a}$, $V_{3b}$, $V_{4a}$ and $V_{4b}$. These two relations may be written as $$V_{3a} = B_{33} V_{3b} + B_{34} V_{4b} \qquad (3)$$

$$V_{4a} = B_{43} V_{3b} + B_{44} V_{4b} \qquad (4)$$

giving the voltages $V_{3a}$ and $V_{4a}$ explicitly in terms of the voltages before the closure of the respective switches, $B_{33}$, $B_{34}$, $B_{43}$ and $B_{44}$ being dimensionless parameters which depend solely on the actual resonant transfer arrangement.

FIG. 1 also indicates the complex magnitudes of the currents $I_1$, $I_2$, $I_3$ and $I_4$ which flow through the corresponding terminals 1, 2, 3 and 4 each time in the direction of the network $N_0$ and the currents $I_3$ and $I_4$ may be defined by $$I_3 = J_3 TD(t) \qquad (5)$$

$$I_4 = J_4 TD(t - T_1) \qquad (6)$$

where $J_3$ and $J_4$ are respective constants having the dimensions of a current and where the function of time $D(t)$ is defined by $$D(t) = \sum_{m=-\infty}^{\infty} d(t - mT) \qquad (7)$$

where $m$ is an integer and this function thus corresponds to an ideal train of periodic pulses with a period T, the function $d(t)$ being the conventional unit impulse having an ideally short duration and the inverse dimension of the time $e$.

Considering the voltage such as $V_3$ across the impedance $Z_3$, a relation may be established between these two quantities and the impedance by which $-J_3$ (since $V_3$ is taken as positive with respect to terminal 3' and since the current $I_3$ enters $Z_3$ at the terminal) must be multiplied to obtain $V_3$ is independent of $J_3$ and is a function of $t$ with a period T. As the Fourier components of (7) have all the same complex amplitude $1/T$, in the absence of a source E one may write $$V_3 = -J_3 \sum_{m=-\infty}^{\infty} Z_3(p+nP) e^{nPt} \qquad (8)$$

where $n$ is an integer and P is the imaginary angular sampling frequency, i.e., $$P = J 2\pi / T \qquad (9)$$

Evidently, a like relation links $V_4$, $Z_4$ and $J_4$. Since $V_3$ and $V_4$ are functions of $t$ with a period T, at any instant of closure of a switch such as $S_1$, when considering $V_3$, the voltages $V_{3b}$ and $V_{3a}$ immediately before and immediately after the considered instant at which the switch $S_1$ closes are independent of this particular instant, although this would not be true of the actual instantaneous amplitudes. Considering the sum as well as the difference of such voltages as $V_{3a}$ and $V_{3b}$, the following relations may be written down $$V_{3a} + V_{3b} = 2U_3 \qquad (10)$$

$$V_{4a} + V_{4b} = 2U_4 \qquad (11)$$

$$V_{3b} - V_{3a} = 2R_{C1} J_3 \qquad (12)$$

$$V_{4b} - V_{4a} = 2R_{C2} J_4 \qquad (13)$$

wherein $U_3$ and $U_4$ are new voltage parameters respectively equal to the half sum of the voltages across $Z_3$ and $Z_4$ immediately before and immediately after the closure of the respective switches $S_1$ and $S_2$, while $R_{C1} J_3$ and $R_{C2} J_4$ are the corresponding half difference voltages across $Z_3$ and $Z_4$ respectively, the new parameters $R_{C1}$ and $R_{C2}$ being evidently resistive.

Just as (8) establishes a proportional relation between such voltages as $V_3$ and such currents as $J_3$, like relations may be established this time between the voltages $U_3$ and $U_4$ as defined by (10) and (11) in terms of the respective currents $J_3$ and $J_4$. Calling the ratio between $U_3$ and $-J_3$ (in the absence of a source) the pulse impedance $Z_{p3}$ and with a like pulse impedance $Z_{p4}$ linking $U_4$ and $-J_4$, the following relations may be written down $$U_3 = E_0 - J_3 Z_{p3} = E_0 - J_3 \sum_{n=-\infty}^{\infty} Z_3(p+nP) \qquad (14)$$

$$U_4 = -J_4 Z_{p4} = -J_4 \sum_{n=-\infty}^{\infty} Z_4(p+nP) \qquad (15)$$

wherein the voltage parameter $E_0$ appearing in (14) will be discussed later. The second-expressions on the right establishing a definition of the so called pulse impedances $Z_{p3}$ and $Z_{p4}$ have been obtained by considering (8) and the like relation linking $V_4$ and $J_4$, as well as a known theorem by which at a point of discontinuity, a Fourier series converges towards the arithmetic mean of its values just before and just after the discontinuity. Considering (14) and (15) the so called pulse impedances $Z_{p3}$, $Z_{p4}$ will be recognized as equivalent to what was introduced in the United States Patent No. 3,303,438 as the average pulse sequence impedance, itself corresponding to the arithmetic mean of two so called pulse sequence "impedances" previously introduced in the above mentioned article although in the latter, these quantities had in fact the dimensions of impedances divided by the sampling period T.

If the impedance such as $Z_3$ is the input impedance of a network which like $N_1$ is fed on the other side by a voltage of which the amplitude is E as indicated in FIG. 1, the voltages just before and just after the closure of the switch such as $S_1$, i.e., $V_{3b}$ and $V_{3a}$, will no longer be directly proportional to the current $J_3$ but they will be linear functions of this current $J_3$, a constant term $E_0$ being introduced for the expressions giving $V_{3b}$ and $V_{3a}$. This is obtained by a direct application of the superposition principle or what amounts to the same thing, Thevenin's theorem in its generalized version. The voltage $E_0$ appearing in (14) is therefore the open circuit voltage measured across terminals 3–3' and due solely to the voltage E (FIG. 1).

The pulse impedances $Z_{p3}$ and $Z_{p4}$ introduced in (14) and (15) have been defined by these same relations. The resistive parameters $R_{C1}$ and $R_{C2}$ introduced in (12) and (13) can be defined in the following manner. Considering for instance the voltage $V_3$ across the impedance $Z_3$ at an instant when $S_1$ closes for what may be considered an infinitely short time, the product of $C_1$ by the voltage difference $V_{3a} - V_{3b}$ is proportional to the charge brought at that instant by the current $I_3$. Accordingly, by considering (5) the charge $C_1(V_{3a} - V_{3b})$ is equal to $-J_3 T$. Therefore the parameters $R_{C1}$ and $R_{C2}$ may be expressed as $$R_{C1} = T/2C_1 \qquad (16)$$

$$R_{C2} = T/2C_2 \qquad (17)$$

this by a direct application of (12) and (13).

Due to the relations established so far, it is now possible to introduce a so called pulse impedance interconnecting circuit related to the resonant transfer circuit of FIG. 1 and which will facilitate the analysis of its properties. In this related circuit, instead of the voltages such as $V_3$ and $V_4$ and the currents $I_3$ and $I_4$ which appear in FIG. 1, it is now the voltages $U_3$ and $U_4$ as well as the currents $J_3$ and $J_4$ which are used.

FIG. 3 shows this related pulse impedance interconnecting circuit which uses a pulse impedance 4-terminal interconnecting network labelled $N_e$ having input terminals 3–3' and output terminals 4–4' by analogy with the circuit of FIG. 1. But this time it is the voltage $U_3$ which appears across terminals 3–3′ and the voltage $U_4$ which is present across terminals 4–4′, while the currents $J_3$ and $J_4$ flow into $N_e$ through the terminals 3 and 4 respectively. The introduction of this 4-terminal interconnecting network is possible due to the fact that from the relations (10), (11), (12) and (13) the voltages $V_{3a}$, $V_{3b}$, $V_{4a}$ and $V_{4b}$ may be replaced into the two linear relations (3) and (4), giving $$U_3 = W_{33}J_3 + W_{34}J_4 \qquad (18)$$

$$U_4 = W_{43}J_3 + W_{44}J_4 \qquad (19)$$

wherein the impedance parameters $W_{33}$, $W_{34}$, $W_{43}$ and $W_{44}$ together constitute the impedance matrix of the 4-terminal interconnecting network $N_e$ of FIG. 3, and are defined by $$W_{33} = \frac{2 - 2B_{44} - B}{B} R_{C1} \qquad (20)$$

$$W_{34} = \frac{2B_{34}}{B} R_{C2} \qquad (21)$$

$$W_{43} = \frac{2B_{43}}{B} R_{C1} \qquad (22)$$

$$W_{44} = \frac{2 - 2B_{33} - B}{B} R_{C2} \qquad (23)$$

wherein B is function of the parameters $B_{33}$, $B_{34}$, $B_{43}$ and $B_{44}$, i.e., $$B = 1 - B_{33} - B_{44} + B_{33}B_{44} - B_{34}B_{43} \qquad (24)$$

Thus for the direct resonant transfer the parameters $W_{33}$ and $W_{43}$ are resistances proportional to $R_{C1}$ while the parameters $W_{34}$ and $W_{44}$ are resistances proportional to $R_{C2}$.

FIG. 3 shows that the terminals 3–3′ of $N_e$ are fed by a source of voltage amplitude $E_0$ and of internal impedance $Z_{p3}$. This is a direct result of (14) which also defines the pulse impedance $Z_{p3}$ while $E_0$ was defined as the open circuit voltage amplitude of the network $N_1$ of FIG. 1 when solely fed by the source of voltage amplitude E. Likewise, the pulse impedance $Z_{p4}$ is shown by FIG. 3 to be connected across terminals 4–4′, this being justified by (15).

The network of FIG. 3 related to that of FIG. 1 and using the pulse impedances and the interconnecting network will permit to derive expressions for conversion and reflection coefficients which will define the operation of the overall circuit of FIG. 1. In the latter, it will be recalled that all the voltages $V_1$, $V_2$, $V_3$ and $V_4$ are complex amplitudes which depend on the sampling frequency, the multiplying factor $e^{pt}$ having been omitted throughout, this factor affecting the input source shown in FIG. 1 of which only the amplitude E has been indicated. Thus, considering $V_2$ which will be of particular interest in assessing a conversion coefficient for the transmission between terminals 1–1′ and 2–2′, this can be written as a function of the time $t$ as $$V_2(t) = \sum_{n=-\infty}^{\infty} V_{2n} e^{nPt} \qquad (25)$$

wherein P is the imaginary angular sampling frequency previously defined by (9). The current $I_2(t)$ can be defined in exactly the same way as $V_2(t)$, or in other words, one may write $$V_{2n} = -I_{2n}R_2 \qquad (26)$$

linking the component of order $n$ contained in $V_2$ with the component of like order contained in $I_2$.

A conversion coefficient of the order $n$ may then be defined by analogy with the classical theory for constant parameter networks. In the latter, the square of the modulus of the conversion coefficient may be defined as the ratio between the power in the load resistance, i.e., $R_2$, and the maximum power which can be obtained from the source E. Since the first is equal to the square of the modulus of the voltage component $V_{2n}$ of order $n$ across $R_2$ divided by this resistance, while the second is equal to the square of the modulus of E divided by $4R_1$, a conversion coefficient $S_{21n}$ of order $n$ characterizing the transmission from terminals 1–1′ to 2–2′ may be defined as $$S_{21n} = 2 \frac{V_{2n}}{E} \sqrt{\frac{R_1}{R_2}} = -2 \frac{I_{2n}}{E} \sqrt{R_1 R_2} \qquad (27)$$

where the second expression is immediately obtained by a direct application of (26).

The voltage amplitude $V_1(t)$ expressed also as a function of the time $t$ may evidently be written in the same way as $V_2$ in (25), i.e., $$V_1(t) = \sum_{n=-\infty}^{\infty} V_{1n} e^{nPt} \qquad (28)$$

A reflection coefficient of order $n$, i.e., $S_{11n}$, may then be defined by $$S_{11n} = 2 \frac{V_{1n}}{E} = -2 \frac{I_{1n} R_1}{E} \qquad (29)$$

where the second expression in terms of $I_{1n}$ is readily obtained by considering the voltage across terminals 1–1′ in FIG. 1, $I_{1n}$ being evidently the complex current amplitude of order $n$ corresponding to the complex voltage amplitude of order $n$. Thus with this definition of the reflection coefficient of order $n$, the latter will be zero when either the corresponding complex voltage amplitude or complex current amplitude is zero. The definition given by (29) is however valid only when $n$ is distinct from 0.

In the latter case the reflection coefficient of order 0, i.e., $S_{110}$, may be written as $$S_{110} = \frac{2V_{10} - E}{E} = \frac{E - 2I_{10}R_1}{E} \qquad (30)$$

clearly showing that this particular reflection coefficient will be zero when the complex amplitude voltage $V_{10}$ is equal to $E/2$.

The complex current amplitudes of order $n$ such as $I_{2n}$ and $I_{1n}$ which appear in the second expressions given for (27) and (29) as well as the complex currents amplitude $I_{10}$ which appears in the second expression given by (30) may now be calculated in terms of the equivalent circuit shown in FIG. 3. For the current amplitude $I_{10}$, it should be noted that this consists in the linear superposition of the current due to $J_3$ and that which would be due to the source of amplitude E if the terminals 3–3′ were continually open circuited, for the complex current amplitude $I_{1n}$ however this is solely dependent on $J_3$, i.e., Equation 5. Thus $I_{10}$ may be expressed as $$I_{10} = \frac{E}{Z_{11} + R_1} + J_3 M_1(p) \qquad (31)$$

where the first term gives the current due to the source I, $Z_{11}$ representing the open-circuit impedance of network $N_1$ measured across terminals 1–1′. The second term is equal to $J_3$ multiplied by $M_1(p)$ which is the current transfer coefficient of the 4-terminal network $N_1$ from terminals 3–3′ to terminals 1–1′. When the networks such as $N_1$ and $N_2$ of FIG. 1 are reciprocal, such current transfer coefficients as $M_1(p)$ for $N_1$ are equal to the open-circuit voltage transfer coefficients in the opposite direction, i.e., from terminals 1–1′ to terminals 3–3′ for $N_1$.

This well known relation will be quite clear when considering FIG. 8 which represents the network $N_1$ of FIG. 1 as an equivalent reciprocal T-network fed by the source E with its resistance $R_1$ across terminals 1–1′ and left open-circuited at terminals 3–3′. With the series impedance branches connected to terminals 1 and 3 respectively labelled $Z_{11} - Z_{13}$ and $Z_{33} - Z_{13}$ and with the shunt branch connected to the directly coupled terminals 1′ and 3′ labelled $Z_{13}$, it is readily shown that the open-circuit voltage $E_0$ across terminals 3–3' and already referred to in relation to (14) may be expressed in term of $E$ by $$E_0 = M_1 E = \frac{Z_{13}}{Z_{11}+R_1} E \quad (32)$$

wherein the ratio $$\frac{Z_{13}}{Z_{11}+R_1}$$

thus represents either the open-circuit voltage transfer coefficient of $N_1$ from terminals 1–1' to terminals 3–3' or the current transfer coefficient of $N_1$ from terminals 3–3' to terminals 1–1'. For all other complex amplitudes of the currents when the order $n$ is different from 0, the current will have only one term, proportional to $J_3$, i.e., $$I_{1n} = J_3 M_1(p+nP) \quad (33)$$

The complex amplitudes of the products of order $n$ contained in $I_4$ are given by $J_4 e$, this by referring to (6). Accordingly, $I_{2n}$ is given by $$I_{2n} = J_4 M_2(p+nP) e^{-nPT_1} \quad (34)$$

The equivalent circuit of FIG. 3 now permits to derive expressions for the currents $J_3$ and $J_4$, this with the help of Equations 17 and 18 as well as 14 and 15. These currents may thus be written $$J_3 = \frac{E_0(W_{44}+Z_{p4})}{(W_{33}+Z_{p3})(W_{44}+Z_{p4})-W_{34}W_{43}} \quad (35)$$

$$J_4 = \frac{-E_0 W_{43}}{(W_{33}+Z_{p3})(W_{44}+Z_{p4})-W_{34}W_{43}} \quad (36)$$

and the conversion coefficient identified by 27 as well as the reflection coefficients identified by 29 and 30 can now be expressed in terms of the pulse impedances $Z_{p3}$ and $Z_{p4}$, the W parameters and the coefficients $M_1(p)$ and $M_2(p+nP)$, this with the help of such equations as 34 and 36 when applied to find a modified expression for $S_{21}$ given by 27. For this conversion coefficient of order $n$ from the terminals 1–1' to terminals 2–2', Equation 27 thus becomes $$S_{21n} = \frac{2\sqrt{R_1 R_2} W_{43} M_1(p) M_2(p+nP) e^{-nPT_1}}{(W_{33}+Z_{p3})(W_{44}+Z_{p4})-W_{34}W_{43}} \quad (37)$$

The interconnecting network $Ne$ of FIG. 3 will now be more specifically identified in terms of the actual resonant transfer of $N_0$ and the capacitance $C_1$ and $C_2$ of FIG. 1 by considering the particular case of the direct resonant transfer. For the direct resonant transfer system, the network $N_0$ of FIG. 1 is without memory so that there is no stored energy in this network at the beginning of a transfer period. Moreover, the case of the direct resonant transfer means that the two switches $S_1$ and $S_2$ operate simultaneously and remain closed during precisely the same time interval, i.e., $t_1$.

The absence of energy in the network $N_0$ at the beginning of each transfer period when the switches $S_1$ and $S_2$ are simultaneously closed, i.e., $T_1$ of FIG. 1 equal to zero may be secured in various ways. A first possibility is to realize the network $N_0$ in such a way that all its elements, e.g., the highway capacitance, are exactly discharged at the end of the transfer period when the two switches $S_1$ and $S_2$ are reopened, so that they will certainly also be discharged at the beginning of the next transfer interval. A second method consists in realizing the network so as to cause a practically instantaneous discharge from the opening of the switches, or in any event a practically complete discharge between the end of a transfer period and the beginning of the next. Finally, a third method consists in the foreseeing inside $N_0$ auxiliary switches which cause the desired discharge during a period of time suitably chosen between two successve transfer periods. In this case there is nearly always an advantage in operating these auxiliary switches in a periodic manner just as $S_1$ and $S_2$. This is however not strictly necessary since the overall result is the same as soon as the discharge is complete at the beginning of the next transfer period.

The first of these three methods is the more interesting since it is not accompanied by a loss of energy. It is not however possible to realize it perfectly due to the inevitable tolerances on the values of the elements as well as on the timing for the closure of the switches $S_1$ and $S_2$. For this reason, in practice a combination of the first with at least one of the other two methods will be used.

For such a direct resonant transfer arrangement it is now possible to calculate general expressions for the dimensionless B parameters appearing in the relations 3 and 4.

Referring to FIG. 4, the latter shows the 4-terminal network $N_0$ of FIG. 1 when the switches $S_1$ and $S_2$ which are not shown in FIG. 4 are closed so that the two capacitances $C_1$ and $C_2$ respectively across terminals 3–3' and terminals 4–4' are now also directly in shunt across the two ends $N_0$.

It is clear that at high frequency, the network $N_0$ cannot be capacitive at its input and output across terminals 3–3' and 4–4', since otherwise a controlled lossless resonant transfer from capacitance $C_1$ to capacitance $C_2$ and vice-versa would be excluded. Thus, at high frequency for the resonant transfer, the 4-terminal network of FIG. 4 is constituted at the terminals 3–3' solely by the capacitance $C_1$ and likewise at the terminals 4–4' solely by the capacitance $C_2$. Hence, the analysis of the complete circuit of FIG. 4 may be performed by assuming that at the instant the switches are closed, ideal impulses of infinitely short duration, of infinitely large amplitude and of moment $v_{3b}C_1$ and $v_{4b}C_2$ are applied across terminals 3–3' and 4–4' respectively. Indeed, if $v_{3b}$ and $v_{4b}$ represent the instantaneous voltages before the closure of the switches $S_1$ and $S_2$ and thus corresponding to the voltage amplitudes $V_{3b}$ and $V_{4b}$ so far considered, these ideal impulses will instantly carry the instantaneous voltages across terminals 3–3' and 4–4' to the respective required values. The instantaneous voltages $v_{3a}$ and $v_{4a}$ corresponding to the voltages $V_{3a}$ and $V_{4a}$ so far considered are related to the instantaneous voltages $v_{3b}$ and $v_{4b}$ by two linear equations which have coefficients depending on the characteristics of the complete network of FIG. 4. More precisely, since it has been assumed that the network $N_0$ was without energy at the instant the switches were closed, the instantaneous voltages $v_{3a}$ and $v_{4a}$ can be computed in terms of the inverse Laplace transforms at time $t_1$, i.e., the transfer time during which the switches are closed, of the impedance matrix elements of the complete network of FIG. 4. The coefficients by which the instantaneous voltages $v_{3b}$ and $v_{4b}$ must be multiplied to produce the instantaneous voltages $v_{3a}$ and $v_{4a}$ by linear combinations are the parameters $B_{33}$, $B_{34}$, $B_{43}$ and $B_{44}$ of Equations 3 and 4 since all the instantaneous voltages such as $v_{3a}$ are related to the corresponding voltage amplitude $V_{3a}$ by the same proportionality factor. Thus, for the direct resonant transfer system when $N_0$ is without energy at the time of each transfer interval and calling $Lt_1^{-1}$ the inverse Laplace transform at time $t_1$, the parameters $B_{33}$, $B_{34}$, $B_{43}$, and $B_{44}$ are given by $$B_{33} = C_1 L t_1^{-1}(Z_{33}) \quad (38)$$
$$B_{34} = C_2 L t_1^{-1}(Z_{43}) \quad (39)$$
$$B_{43} = C_1 L t_1^{-1}(Z_{43}) \quad (40)$$
$$B_{44} = C_2 L t_1^{-1}(Z_{44}) \quad (41)$$

The 4-terminal complete network of FIG. 4 is reciprocal which means that out of the four impedances defining its impedance matrix and appearing in the above four equations, i.e., $Z_{33}$, $Z_{34}$, $Z_{44}$, and $Z_{43}$, the last two are equal to another. In view of (39) and (40) this means that $B_{34}/B_{43}$ is equal to $C_2/C_1$ and in turn, in view of (16) and (17), equal also to $R_{C1}/R_{C2}$. Accordingly, for the direct resonant transfer, by considering (20) and (21), when the 4-terminal complete network of FIG. 4 is reciprocal, i.e., $Z_{34}=Z_{43}$, the equivalent resonant transfer network of $N_e$ of FIG. 3 is also reciprocal, i.e., $W_{34}=W_{43}$. Since the parameters B are now defined by the Equations 38, 39, 40 and 41 the resistive parameters W expressed by (19), (20), (21) and (22) can be calculated. These are pure resistances directly proportional either to $R_{C1}$ (for $W_{33}$ and $W_{43}$) or to $R_{C2}$ (for $W_{34}$ and $W_{43}$).

The relations between the resistive parameters of the equivalent resonant transfer network $N_e$ of FIG. 3 and those of the complete overall network of FIG. 4 comprising the network $N_0$ associated with the shunt capacitances $C_1$ and $C_2$ can be facilitated by considering alternative representations for the network of FIG. 4.

FIG. 5 shows a circuit equivalent to that of FIG. 4 and which comprises the association obtained by inserting between terminals 3–3' and 4–4' a cascade arrangement of two like 4-terminal networks $N_{01}$ and $N_{02}$, the second being however reversed in direction with regard to the first and being inserted between two ideal transformers $TR_1$ and $TR_2$ having a voltage ratio equal to $C_1/C_2$ as will be justified later. While these two ideal transformers are identical, they are coupled in opposite ways, i.e., as step-up and step-down transformers respectively, so that any impedance present at either the terminals 3–3' or 4–4' is seen unchanged across the other pair of terminals 4–4' or 3–3'. The two networks $N_{01}$ and $N_{02}$ are identical L-networks each comprising a series impedance $Z_S$ followed by a shunt impedance $Z_0-Z_S$ so that $Z_0$ and $Z_S$ represent respectively the open-circuit and short-circuit impedances of the network such as $N_{01}$ measured on the side of the series impedance $Z_S$ away from the shunt impedance $Z_0-Z_S$.

The 3-parameter, i.e., $Z_0$, $Z_S$ and $C_1/C_2$, reciprocal network of FIG. 5 can be readily transformed into the equivalent T-network of FIG. 6 by eliminating the ideal transformers $TR_1$ and $TR_2$ of FIG. 5. The impedance parameters $Z_{33}$, $Z_{34}$, $Z_{43}$ and $Z_{44}$ of the networks of FIGS. 4, 5 and 6 are therefore identified by $$Z_{33}-Z_{34}=Z_S \quad (42)$$

$$Z_{44}-Z_{43}=\frac{C_1 Z_S}{C_2} \quad (43)$$

$$Z_{34}=Z_{43}=\frac{C_1(Z_0-Z_S)}{C_1+C_2} \quad (44)$$

Bearing in mind that at high frequency, not only must the open circuit impedance $Z_0$ measured at terminals 3–3' be equal to that of the capacitance $C_1$ but also the short circuit impedance $Z_S$ and that such impedances measured at high frequency across terminals 4–4' must necessarily be $C_1 Z_0/C_2$ and $C_1 Z_S/C_2$ respectively, it is clear that the choice of $\sqrt{C_1/C_2}$ for the voltage ratios of the ideal transformers $TR_1$ and $TR_2$ as shown in FIG. 5 is justified.

The network of FIG. 6 thus constitutes a general representation of a reciprocal 4-terminal network, with the sole restriction that the two series arms are impedances of like nature since at high frequency, when both $Z_0$ and $Z_S$ are reduced to the impedance of $C_1$ the ratio between the impedances of these two series arms, i.e., $Z_{33}-Z_{34}$ and $Z_{44}-Z_{43}=Z_{44}-Z_{34}$, should be that between $C_2$ and $C_1$.

FIG. 7 represents a $\pi$-network equivalent to the T-network of FIG. 6 and may be readily obtained from the latter by conventional transformations or by starting from a circuit analogous to that of FIG. 5 but wherein the networks $N_{01}$ and $N_{02}$ are reversed, e.g., for $N_{01}$ the shunt impedance $Z_0-Z_S$ is now directly in shunt across terminals 3–3'. The network of FIG. 7 facilitates the identification of $Z_0$ and $Z_S$ with the actual elements of the complete resonant transfer network of FIG. 4 and for the simpler resonant transfer circuit of the direct type it is readily seen that $Z_0$ identifies itself with $1/pC_1$, the impedance of the capacitance $C_1$.

Making use of the inverse Laplace transforms at time $t_1$ of the impedances $Z_0$ and $Z_S$ so defined and of (42), (43), (44), the parameters identified by (38) to (41) can now be expressed as $$B_{33}=\frac{C_1 B_0+C_2 B_S}{C_1+C_2} \quad (45)$$

$$B_{34}=\frac{C_2(B_0-B_S)}{C_1+C_2} \quad (46)$$

$$B_{43}=\frac{C_1(B_0-B_S)}{C_1+C_2} \quad (47)$$

$$B_{44}=\frac{C_2 B_0+C_1 B_S}{C_1+C_2} \quad (48)$$

where the new parameters $B_0$ and $B_S$ are given by $$B_0=B_{33}+B_{34}=B_{43}+B_{44}=C_1 Lt_1^{-1}(Z_0) \quad (49)$$

$$B_S=B_{33}-B_{43}=B_{44}-B_{34}=C_1 Lt_1^{-1}(Z_S)=Lt_1^{-1}\left(\frac{Z_{33}-Z_{44}}{\frac{1}{C_1}-\frac{1}{C_2}}\right) \quad (50)$$

which not only define the parameters $B_0$ and $B_S$ as inverse Laplace transforms of $Z_0$ and $Z_S$ respectively each multiplied by $C_1$, but also give a relation between the four parameters $B_{33}$, $B_{34}$, $B_{43}$ and $B_{44}$ due to the networks of FIG. 5, 6 and 7 being reciprocal, i.e., $Z_{34}=Z_{43}$. This condition between these four parameters permits to write a new expression for the parameter B given by (23), in function of $B_0$ and $B_S$, i.e., $$B=(1-B_0)(1-B_S) \quad (51)$$

Additionally, (50) expresses $B_S$ as a function of $Z_{33}-Z_{44}$, this by using (42), (43) and (44).

Returning to the conversion coefficient of order $n$, i.e., $S_{21n}$ defined by (37) and specifying the transmission from terminals 1–1' to terminals 2–2' for any component of the various sidebands which are obtainable at the output of $N_2$ (FIG. 1) depending on the passband of the latter, the parameters $W_{32}$, $W_{34}$, $W_{43}$ and $W_{44}$ appearing in (37) and defined by (19) to (22) can be expressed in terms of the $B_0$ and $B_S$ dimensionless coefficients. On the other hand the open circuit voltage transfer coefficients $M_1$ and $M_2$ also appearing in (37) can be expressed in terms of the resistive part of the impedances $Z_3$ and $Z_4$ respectively and in terms of the respective terminating resistances $R_1$ and $R_2$. This last can best be explained in relation to FIG. 8.

Considering FIG. 8 already described in relation to (32) defining the open circuit voltage $E_0$ at terminals 3–3' and assuming that $p$ is a pure imaginary angular frequency so that $\omega=-jp$ is real, the square of the coefficient $M_1$ may in view of this last equation be expressed as $$M_1^2=\frac{Z_{13}}{Z_{11}+R_1}\frac{Z_{13}}{Z_{11}-R_1}\frac{Z_{11}-R_1}{Z_{11}+R_1} \quad (52)$$

giving $M_1^2$ as a product of three factors, the last of which can be recognized as the reflection coefficient at terminals 1–1', i.e., $h_1$ given by $$h_1=\frac{Z_{11}-R_1}{Z_{11}+R_1} \quad (53)$$

If the network $N_1$ is purely reactive as is usually the case, $Z_{11}$, $Z_{13}$ and $Z_{33}$ are all purely reactive and accordingly the second factor of (52) represents the complex conjugate $\overline{M}_1$ of $M_2$. Thus (52) may be written as $$M_1^2=M_1\overline{M}_1 h_1 \quad (54)$$

If the impedances of $N_1$ are purely reactive, the input impedance $Z_3$ measured across terminals 3–3' in the direction of $N_1$ may be written as $$Z_3 = Z_{33} - Z_{13} + \frac{Z_{13}(R_1 + Z_{11} - Z_{13})}{R_1 + Z_{11}} = jX_{33} - jX_{13} +$$

$$\frac{jX_{13}(R_1 + jX_{11} - jX_{13})}{R_1 + jX_{11}} = R_3 + jX_3 \quad (55)$$

in which the second expression for $Z_3$ is readily obtained by replacing each impedance such as $Z_{33}$ in function of the corresponding reactance such as $jX_{33}$ and wherein the third expression for $Z_3$ identifies its resistive part as $R_3$ and its reactive part as $X_3$. By transforming the second expression for $Z_3$, the value of $R_3$ is found to be $$R_3 = \frac{X_{13}^2}{R_1^2 + X_{11}^2} R_1 = M_1 \overline{M}_1 R_1 \quad (56)$$

In association with (54) the latter thus gives $$M_1^2 = \frac{R_3}{R_1} h_1 \quad (57)$$

and since by virtue of $Z_{11}$ being purely reactive, i.e., equal to $jX_{11}$, the modulus of $h_1$ is equal to unity, this means that the square of the modulus of $M_1$ can be expressed directly as the ratio of $R_3$ and $R_1$, i.e, $$|M_1|^2 = \frac{R_3}{R_1} \quad (58)$$

A like expression can be secured for the square of the modulus of $M_2$ which is thus equal to the ratio between $R_4$, the resistive part of $Z_4$, and $R_2$, the terminating resistance across terminals 2–2'. But it should be remembered that whereas $R_3$ is a function of $\omega$, $R_4$ will be a function of $$\omega + \frac{2\pi n}{T}$$

as is clear from (37).

In order to transform this expression giving $S_{21n}$, it is still necessary to have the parameters $W_{33}$, $W_{34}$, $W_{43}$ and $W_{44}$ expressed in terms of the dimensionless coefficient $B_S$ and $B_0$ as well as the resistance $R_{C1}$ and $R_{C2}$ previouly defined.

FIG. 9 shows the equivalent resonant transfer network $N_e$ introduced in FIG. 3, in the form of a T-network of which the series resistances are $W_{33} - W_{34}$ on the side of terminal 3 and $W_{44} - W_{43}$ on the side of terminal 4. The shunt resistance is $W_{34} = W_{43}$ by virtue of the equivalent network $N_e$ being reciprocal as previously explained. Making use of the Equations 45 to 48 and 51 into 19 to 22, these three resistances shown in FIG. 9 can be expressed as $$W_{33} - W_{34} = \frac{1 + B_S}{1 - B_S} R_{C1} \quad (59)$$

$$W_{44} - W_{43} = \frac{1 + B_S}{1 - B_S} R_{C2} \quad (60)$$

$$W_{34} = W_{43} = \frac{2(B_0 - B_S)}{(1 - B_0)(1 - B_S)} \frac{R_{C1} R_{C2}}{R_{C1} + R_{C2}} \quad (61)$$

It is now possible to obtain a very simple expression for the conversion coefficient of order $n$, i.e., $S_{21n}$ given by (37) and particularly in the case of the direct resonant transfer for which the exponential term contained in this last expresson disappears since $T_1$ (FIG. 1) is equal to 0 as the two switches $S_1$ and $S_2$ are simultaneously operated.

Considering the equivalent circuit of FIG. 3 with the structure of $N_e$ given by the T-network of FIG. 9, the ideal sitaution is to have this last network reduced to mere interconnections between terminals 3 and 4 on the one hand and terminals 3' and 4' on the other. In this case the open circuit voltage source $E_0$ of FIG. 3 is merely feeding the two pulse impedances $Z_{p3}$ and $Z_{p4}$ in series. These two pulse impedances can be decomposed into a resistive and a reactive part such as $R_{p3}$ and $jX_{p3}$ for $Z_{p3}$ and the resistive part $R_{p3}$ of the pulse impedance $Z_{p3}$ can be expressed in function of the resistive part $R_3$ of $Z_3$ in the same way as Equation 14 gives the pulse impedance $Z_{p3}$ as a series expressed in terms of $Z_3$, i.e., $$R_{p3} = \sum_{n=-\infty}^{\infty} R_3\left(\omega + \frac{2\pi n}{T}\right) \geq R_3(\omega) \quad (62)$$

As expressed by the above, $R_{p3}$ must be at least equal to $R_3(\omega)$ representing the resistive part of the impedance $Z_3$. A like reasoning can be made for the resistive part $R_{p4}$ of the pulse impedance $Z_{p4}$ which must at least be equal to $$R_4\left(\omega + \frac{2\pi n}{T}\right)$$

representing the resistive part of the impedance $Z_4$.

As stated before, in the ideal conditions, the network of FIG. 9 should disappear to permit a direct interconnection between the pulse impedances $Z_{p3}$ and $Z_{p4}$ in FIG. 3 and these conditions will be attained when $W_{33}$, $W_{34} = W_{43}$ and $W_{44}$ are equal to one another and in fact infinite since the two series branches of the T-network of FIG. 9 can be replaced by a short-circuit when $B_S = -1$ while the shunt branch can be replaced by an open circuit when $B_0$ is equal to 1. Considering (37), in such a case, by dividing both the numerator and the denominator by $W_{43}$, only $Z_{p3} + Z_{p4}$ will be left in the denominator. For a maximum value of $S_{21m}$ this denominator should be minimum and this will be the case if both the resistive part of $Z_{p3} + Z_{p4}$ and the reactive part of this combined pulse impedance are minimized. This will be true when $$R_{p3} = R_3(\omega) \quad (63)$$

$$R_{p4} = R_4\left(\omega + \frac{2\pi n}{T}\right) \quad (64)$$

$$X_{p3} = -X_{p4} \quad (65)$$

are satisfied, (63) and (64) in view of the minimum value for the resistive part such as $R_{p3}$ being equal to $R_3(\omega)$ as shown by (62).

If the above three relations are satisfied in addition to (58) and a like relation for the modulus of $M_2$, by replacing into (37) it is found that the modulus of $S_{21n}$ may reach a maximum value of unity when $R_3$ is equal to $R_4$. Filters such as the networks $N_1$ and $N_2$ of FIG. 1 which satisfy such conditions may therefore be termed ideal filters and more specifically ideal filters for single sideband modulation by direct resonant transfer since the direct resonant transfer is the particular case which has been considered immediately above while it is also a single sideband modulation which has been envisaged. Otherwise, for double sideband modulation one would have to consider two conversion coefficients $S_{21'n}$ and $S_{21'-n}$ of order $n$ and $-n$ respectively whose moduli should be equal to another.

Consideration will now be given to the value of the conversion coefficient $S_{21n}$ in the case of intermediate storage resonant transfer. For important practical applications of the resonant transfer principle in telecommunication exchanges, it may be desirable that some communications established by any given station should be made in accordance with the direct resonant transfer principle while others should be made following the intermediate storage principle. When considering also intermediate storage resonant transfer, instead of ideal filters satisfying (63) (64) and (65), so called universal ideal filters can then be defined. These have the further properties that both $R_{p3}$ and $R_{p4}$ are equal to the same constant resistance while both $X_{p3}$ and $X_{p4}$ are equal to zero. This will be shown below.

Considering FIG. 2 which has already been referred to and which describes the resonant transfer network $N_0$ in more detail in the case of an intermediate storage transmission, the amplitudes $I_3$ and $I_4$ of the currents entering the networks $N_{0A}$ and $N_{0B}$ through the switches $S_1$ and $S_2$ respectively are still given by (5) and (6). Likewise, the amplitudes $I_5$ and $I_6$ of the currents flowing respectively through terminals 5 and 6 towards the centre of the network and formed in like manner by modulated pulse trains can be defined by $$I_5 = J_5 TD(t) \tag{66}$$

$$I_6 = J_6 TD(t - T_1) \tag{67}$$

While $V_0$ designates the voltage amplitude across the intermediate storage capacitance $C_0$, the value of $V_0$ just before the arrival of a pulse of $I_5$ due to the closure of switch $S_3$ can be designated by $V_{5b}$ and in like manner $V_{5a}$ can be used to identify the value of $V_0$ immediately after such a pulse. In a similar fashion, $V_{6b}$ and $V_{6a}$ can identify the values of this same voltage amplitude $V_0$ just before and just after the arrival of a pulse of $I_6$ through terminal 6, i.e., upon switch $S_4$ being closed. Keeping the same previous definitions for the voltage amplitudes $V_{3a}$, $V_{3b}$, $V_{4a}$ and $V_{4b}$, it is clear that the previous analysis establishing relations between these four voltage amplitudes on each side of network $N_0$, e.g., (3) and (4) and derivations thereof, remain valid in the case of the corresponding voltages on each side of the network $N_{0A}$ as well as for the corresponding voltages on each side of the network $N_{0B}$. In the case of the network $N_{0A}$, the relations will be between the voltage amplitudes $V_{3a}$, $V_{5a}$, $V_{3b}$, and $V_{5b}$, whereas for the network $N_{0B}$, the relations will be between the voltages $V_{4a}$, $V_{6a}$, $V_{4b}$ and $V_{6b}$.

Additional relations of the type given by (10), (11), (12) and (13) may also be written, this time in connection with the voltage amplitudes $V_{5a}$, $V_{5b}$, $V_{6a}$ and $V_{6b}$. These are $$V_{5a} + V_{5b} = 2U_5 \tag{68}$$

$$V_{6a} + V_{6b} = 2U_6 \tag{69}$$

$$V_{5a} - V_{5b} = 2RC_0 J_5 \tag{70}$$

$$V_{6a} - V_{6b} = 2RC_0 J_6 \tag{71}$$

these last two by taking into account currents $J_5$ and $J_6$ (not shown) flowing in directions corresponding to those of $I_5$ and $I_6$ respectively and by remarking that $V_{5a} - V_{5b}$ and $V_{6a} - V_{6b}$ can only depend on $I_5$ and $I_6$ respectively. The first two above relations introduce the auxiliary voltage parameters $U_5$ and $U_6$ and the last two introduce also the resistance $RC_0$ which in the same manner as $RC_1$ and $RC_2$, i.e., Equations 16 and 17 is given in function of the capacitance $C_0$ by $$RC_0 = T/2C_0 \tag{72}$$

Remembering that the switches $S_1$ and $S_3$ close in unison and that is also true for the switches $S_2$ and $S_4$ but with a time lag equal to $T_1$ or in other words that the closure of the switches $S_2$ and $S_4$ leads the closure of the switches $S_1$ and $S_3$ by a time equal to $T_2$ since $T_1 + T_2$ is equal to the sampling period T, expressions for the voltage amplitudes $V_{5b}$ and $V_{6b}$ immediately before the closure of the respective switches $S_3$ and $S_4$ can be derived. Such voltage amplitudes immediately before the closure of the switches, i.e., $V_{5b}$ and $V_{6b}$ will be directly proportional to the respective voltage amplitudes immediately after the closure of the opposite switch, i.e., $V_{6a}$ and $V_{5a}$ respectively, i.e., $$V_{5b} = V_{6a} e^{-pT_2 - a'_2} \tag{73}$$

$$V_{6b} = V_{5a} e^{-pT_1 - a_1} \tag{74}$$

Since FIG. 2 shows resistances such as $R'_0$ permanently connected across capacitance $C_0$ and corresponding to the leakage resistance as well as another resistance $R_0$ which may be temporarily connected across such a capacitance when the switch $S_0$ is closed, the above equations show exponential terms which include not only a term $-pT_2$ or $-pT_1$ respectively corresponding to the time delay in the operation of the switches $S_3$ and $S_4$, but in addition a term $-a_2$ or $-a_1$ corresponding to the attenuation produced by such resistances during the time interval separating the closure of the switch $S_3$ from the closure of the switch $S_4$ and vice versa. Clearly, during the time that $S_0$ is closed the time constant for the intermediate storage capacitance $C_0$ will be equal to the product of that capacitance by the parallel combination of the resistances $R_0$ and $R'_0$ while during the rest of the time interval separating the closure of a switch $S_3$ from the closure of a switch $S_4$, while switch $S_0$ remains open, it will be equal to the product of $C_0$ solely by the resistance $R'_0$. Accordingly, such constants as $a_2$ and $a_1$ appearing (73) and (74) are readily calculated by dividing the corresponding time intervals by the time constants.

Two linear relations corresponding to (18) and (19) may now be established this time between the voltages $U_5$ and $U_6$ and the currents $J_5$ and $J_6$, with the help of (68), (69), (70), (71), (73) and (74). These are $$U_5 = W_{55} J_6 + W_{56} J_6 \tag{75}$$

$$U_6 = W_{65} J_5 + W_{66} J_6 \tag{76}$$

wherein the impedance parameters $W_{55}$, $W_{56}$, $W_{65}$ and $W_{66}$ are identified by $$W_{55} = W_{60} = R_{C0} \coth \frac{pT + a_1 + a_2}{2} \tag{77}$$

$$W_{65} W_{65} = R_{C0}^2 \operatorname{csch}^2 \frac{pT + a_1 + a_2}{2} \tag{78}$$

$$\frac{W_{56}}{W_{65}} = e^{-p(T_2 - T_1) - (a_2 - a_1)} \tag{79}$$

Accordingly, to the arrangement connected between the terminals 5–5' and 6–6' of FIG. 2 corresponds a transposed equivalent quadripole in the same way as the equivalent network $N_e$ of FIG. 3 corresponds to the actual resonant transfer network $N_0$ of FIG. 1, and as indicated by (77), this transposed equivalent 4-terminal network (not shown) is symmetrical since its impedance parameters $W_{55}$ and $W_{66}$ are equal to one another. On the other hand, such a transposed equivalent network or pulse impedance interconnecting network as previously defined in relation to FIG. 3 is not generally reciprocal since this would imply that $W_{56}$ should be equal to $W_{65}$ and (79) shows that this is not necessarily the case.

In order to find the conversion coefficient $S_{21n}$ in the case of intermediate storage resonant transfer, it is however such impedance parameters as $W_{33}$, $W_{34}$, $W_{43}$ and $W_{44}$ identifying the overall transmission between terminals 3–3' and terminals 4–4', i.e., (18) and (19) which must be found. These can be calculated in terms of like parameters corresponding to the networks $N_{0A}$ and $N_{0B}$ of FIG. 2 as well as in terms of the parameters $W_{55}$, $W_{56}$, $W_{65}$ and $W_{66}$ which relate to the central part of the network $N_0$. However, for the present purpose of finding the conditions which must be satisfied by so-called universal filters which can operate equally well for resonant transfer as well as for intermediate storage resonant transfer transmissions, it may be assumed that the direct resonant transfer networks $N_{0A}$ and $N_{0B}$ of FIG. 2 do not introduce any losses so that $U_3$ is equal to $U_5$ while $U_4$ is equal to $U_6$. Also, in view of the directions of the currents indicated in FIG. 2, the related currents $J_3$ and $J_5$ are equal to one another and this is also true of the related currents $J_4$ and $J_6$. This means that (75) and (76) directly lead to $$U_3 = W_{55} J_3 + W_{56} J_4 \tag{80}$$

$$U_4 = W_{65} J_3 + W_{66} J_4 \tag{81}$$

By direct analogy with (37), the conversion coefficient $S_{21n}$ defining the transmission from terminals 1–1' to terminals 2–2' may now be written in terms of the impedance parameters defined by (77), (78) and (79), i.e., $$S_{21n} = \frac{2\sqrt{R_1 R_2}\, W_{65} M_1(p) M_2(p+nP) e^{-nPT_1}}{(W_{55}+Z_{p3})(W_{66}+Z_{p4}) - W_{56} W_{65}} \quad (82)$$

If the source shown in FIG. 1 to be connected across terminals 1–1' is now assumed to be connected across terminals 2–2', the conversion coefficient $S_{12n}$ characterizing the transmission in the reverse direction may be written as $$S_{12n} = \frac{2\sqrt{R_1 R_2}\, W_{56} M_1(p+nP) M_2(p)}{(W_{55}+Z_{p3})(W_{66}+Z_{p4}) - W_{56} W_{65}} \quad (83)$$

In the above the denominator does not differ from that of $S_{21n}$ given by (82) in view of its symmetry and in the numerator, $W_{56}$ replaces $W_{65}$, $M_1$ is a function of $p+nP$, $M_2$ is a function of $p$, in views of $S_{12n}$ characterizing the reverse sense of transmission. Also, recalling that the factor $e^{-nPT_1}$ appears in the expression (34) for $I_{2n}$ but not in the expression (33) for $I_{1n}$, this factor disappears in the numerator of the expression (83). Since it will be the modulus of $S_{21n}$ and that of $S_{12n}$ which will actually be of interest to characterize the transmissions, in view of such an equation as (58) expressing the square of the modulus of $M_1$ as the ratio between the resistance $R_3$ and the resistance $R_1$ and bearing in mind the remark after Equations 63, 64 and 65 to the effect that $R_3$ should be equal to $R_4$ in the case of an ideal filter for single sideband modulation by direct resonant transfer, it is clear that the difference between $S_{21n}$ and $S_{12n}$ depends on the value of the factor $W_{56}/W_{65} e^{nPT_1}$. This factor may be written as $$\frac{W_{56}}{W_{65}} e^{nPT_1} = e^{\frac{nPT}{2} - (2p+nP)\frac{T_2-T_1}{2} - (a_2-a_1)} = (-1)^n e^{-(2p+nP)\frac{T_2-T_1}{2}} \quad (84)$$

in which the first expression for the factor follows from (79) after some rearrangement of the terms appearing in the exponent and bearing in mind, e.g., FIG. 2, that T is equals to $T_1+T_2$. The second expression follows by recalling that (9) identifies $PT/2$ as $j\pi$ so that $$e^{\frac{nPT}{2}}$$

is equal to $+1$ or $-1$ depending on whether $n$ is even or odd. Also, in the second expression (84) $a_2$ has been made equal to $a_1$.

This last condition can readily be satisfied if $R'_0$ is large enough. Then, the dimensionless parameters $a_1$ and $a_2$ are either both zero if $R_0$ and $S_0$ are absent or they can readily be made equal to one another if $S_0$ is closed during appropriate lengths of time occupying part of the intervals $T_1$ and $T_2$ respectively, i.e., equal lengths of time of the same resistance $R_0$ is introduced by the closure of $S_0$ both during $T_1$ and $T_2$. The resistances $R_0$ introduced across $C_0$ during part of the time intervals $T_1$ and $T_2$ may either be positive in which case $a_1$ and $a_2$ are also positive, or they may be negative in which case $a_1$ and $a_2$ are negative whereby the voltage amplitude $V_0$ may be increased instead of decreased during such time intervals separating the closures of the switches $S_3$ and $S_4$.

Considering the second expression of (84), it is thus clear that provided $a_1$ is equal to $a_2$ including the particular case when both are equal to 0, the only difference between $S_{21n}$ and $S_{12n}$ is a delay $$\frac{T_2-T_1}{2}$$

for the signal of frequency corresponding to $p$ and a like delay for the signal of frequency corresponding to $p+nP$, such delays being independent of frequency.

Thus, while an intermediate storage resonant transfer circuit like that of FIG. 2 is not a reciprocal circuit arrangement since this would imply strict equality between the conversion coefficients $S_{21n}$ and $S_{12n}$, the only difference between these two coefficients characterizing transmissions in reverse directions is only a delay and in general, such circuits whether they involve variable elements as for the intermediate storage circuit of FIG. 2, or not, will be termed quasi-reciprocal. Assuming that the intermediate storage resonant transfer circuit of FIG. 2 is quasi-reciprocal so that $a_1$ is equal to $a_2$, and more particularly since ideal conditions have to be determined that both $a_1$ and $a_2$ are equal to zero, the impedance parameters $W_{55}$, $W_{66}$, $W_{56}$ and $W_{65}$ identified by (77), (78) and (79) may be replaced into (82) giving $$S_{21n} = (-1)^n \frac{2\sqrt{R_1 R_2}\, M_1(p) M_2(p+nP) R_{C0} e^{(p+nP)\frac{T_2-T_1}{2}}}{(Z_{p3} Z_{p4}+R_{C0}^2) \sinh\frac{pT}{2} + R_{C0}(Z_{p3}+Z_{p4})\cosh\frac{pT}{2}} \quad (85)$$

But the exponential factor in the above, corresponding to a delay, and the plus or minus sign depending on the parity of $n$ disappear when considering the square of the modulus of $S_{21n}$ which can be expressed from (85) as $$|S_{21n}|^2 = \frac{4R_{C0}^2 R_3(\omega) R_4\left(\omega+\frac{2n\pi}{T}\right)}{\left|j(Z_{p3}Z_{p4}+R_{C0}^2)\sin\frac{\omega T}{2} + R_{C0}(Z_{p3}+Z_{p4})\cos\frac{\omega T}{2}\right|^2}$$

$$= \frac{4R_{C0}^2 R_{p3} R_{p4}}{4R_{C0}^2 R_{p3} R_{p4} + \left|j(R_{C0}^2 - Z_{p3}\overline{Z}_{p4})\sin\frac{\omega T}{2} + R_{C0}(Z_{p3}-\overline{Z}_{p4})\cos\frac{\omega T}{2}\right|^2} \quad (86)$$

The first expression which is given readily follows from (85) using (58) for the square of the modulus of $M_1$ and a like relation for the square of the modulus of $M_2$, while $p$ is replaced by $j\omega$. For abitrary values of the real and imaginary parts of the pulse impedances $Z_{p3}$ and $Z_{p4}$, of $R_{C0}$ and of $\omega$, i.e., for any given value of the denominator of the first expression in (86) the latter will be maximum if (63) and (64) are satisfied. Then the first expression may be transformed into the second in which the denominator is now written out as a first term equal to the numerator plus a second term which is a perfect square. Clearly then, the modulus of $S_{21n}$ will again be maximum and in fact equal to unity when this second term in the denominator is equal to 0. Equating real and imaginary parts of this second denominator term, one obtains $$R_{C0}(R_{p3}-R_{p4}) = (X_{p4} R_{p3} - X_{p3} R_{p4})\tan\frac{\omega T}{2} \quad (87)$$

$$R_{C0}(X_{p3}+X_{p4}) = (R_{p3} R_{p4} + X_{p3} X_{p4} - R_{C0}^2)\tan\frac{\omega T}{2} \quad (88)$$

But when previously considering ideal filters for single sideband modulation by direct resonant transfer it has already been shown that $R_{p3}$ should be equal to $R_{p4}$ while the sum of $X_{p3}$ and $X_{p4}$ should be equal to zero, i.e., (65). In such a case, the above two relations directly lead to $$R_{p3} = R_{p4} = R_{C0} \quad (89)$$

$$X_{p3} = X_{p4} = 0 \quad (90)$$

Thus, filters such as the networks $N_1$ and $N_2$ of FIG. 1 which possess the property that the square of the modulus of their open circuit voltage transfer coefficients are defined by relations such as (58) while their pulse impedances such as $Z_{p3}$ are purely resistive and equal to a constant resistance in the passband may be termed universal ideal filters or more specifically universal ideal filters for single sideband modulation with resonant transfer. They will be equally effective whether the direct resonant transfer principle is used or whether intermediate storage is applied as described immediately above.

An analytical expression for a pulse impedance, such as $Z_{p4}$ may be obtained by considering that an impedance such as $Z_4(p)$ may be defined analytically by $$Z_4(p) = \sum_{i=1}^{N} \frac{B_i}{(p-p_i)\frac{T}{2}} \quad (91)$$

where N represents the degree of $Z_4(p)$ and $B_i$ are resistive constants so that using (17), (2) may be written $$R_{C2} = \frac{T}{2C_2} = \frac{T}{2} \lim_{p \to \infty} pZ_4(p) = \sum_{i=1}^{N} B_i \quad (92)$$

In (91), the N poles $p_i$ of $Z_4(p)$ are assumed to be all distinct. An expression for $Z_4(p)$ and a corresponding one for $V_{p4}$ could also be obtained when multiple poles are considered, but in practice these will generally not be encountered for such impedances as $Z_4(p)$.

With $Z_4(p)$ defined as above, an analytical expression for the pulse impedance $Z_{p4}$ may readily be obtained from Equations 17 and 18 in the previously mentioned article by adding these two expressions and multiplying by $T/2$, i.e., half the sampling period:

$$Z_{p4} = \sum_{i=1}^{N} \frac{B_i}{\tanh(p-p_i)\frac{T}{2}} =$$

$$\sum_{i=1}^{N} \frac{1 - \tanh \frac{pT}{2} \tanh \frac{p_i T}{2}}{\tanh \frac{pT}{2} - \tanh \frac{p_i T}{2}} B_i = -$$

$$\sum_{i=1}^{N} B_i \tanh \frac{p_i T}{2} + \sum_{i=1}^{N} \frac{B_i \operatorname{sech}^2 \frac{p_i T}{2}}{\tanh \frac{pT}{2} - \tanh \frac{p_i T}{2}}$$

$$(93)$$

clearly showing that with $Z_4(p)$ a function of $pT/2$, the pulse impedance is a function of $\tanh pT/2$, the third form of $Z_{p4}$ emphasizing the fact that it is an analytical function of $\tanh pT/2$.

When the transformed variable $\tanh pT/2$ is equal to unity, (93) and (92) indicate that $Z_{p4}$ is equal to $R_{C2}$.

Using then a known theorem on bounded functions and transposing it to positive real functions, it can be proved that if a pulse impedance such as $Z_{p4}$ is equal to a constant resistance for a given frequency interval having a length distinct from zero, then this constant value must necessarily be that particular constant value $R_{C2}$ to which the pulse impedance $Z_{p4}$ is equal for a particular value of the variable $\tanh pT/2$, i.e., $\tanh pT/2=1$. If the networks $N_1$ and $N_2$ of FIG. 1 are such universal ideal filters for single sideband modulation by direct resonant transfer, i.e., if $$Z_{p3} = R_{p3} = R_3(\omega) = R_{C1} \quad (94)$$

$$Z_{p4} = R_{p4} = R_4\left(\omega + \frac{2\pi n}{T}\right) = R_{C2} \quad (95)$$

together with (58) and a corresponding relation for $M_2$ are satisfied within the respective passbands of the filters, then remembering that $T_1$ is equal to zero for the direct resonant transfer, the modulus of $S_{21n}$ defined by (37) can be expressed in the general case of the equivalent network of FIG. 9 in terms of the parameters $B_0$ and $B_S$ as $$|S_{21n}| = \frac{2\sqrt{R_1 R_2} W_{43} |M_1(p)| |M_2(p+nP)|}{(W_{33}+Z_{p3})(W_{44}+Z_{p4}) - W_{34}W_{43}} = \frac{B_0 - B_S}{2} \quad (96)$$

where the very simple second expression simply equal to half the difference between $B_0$ and $B_S$ is obtaind by making use of (94), (95) together with (59), (60), (61) and finally (58) for the modulus of $M_1$ as well as an analogous expression for the modulus of $M_2$.

The dimensionless parameters $B_0$ and $B_S$ defined by (49) and (50) are similar to such parameters as $B_{33}$ previously defined by (38) and the modulus of $B_0$ as well as that of $B_S$ cannot exceed unity. This is true if the 4-terminal network $N_{01}$ of FIG. 5 is passive. One must note first of all that the impedances $Z_0$ and $Z_S$ characterizing this 4-terminal network and on which $B_0$ and $B_S$ respectively depend, each become the impedance of the capacitance $C_1$ at high frequency. Thus, considering for instance the impedance $Z_0$ and assuming that it is devoid of energy, if at a given instant a current impulse is applied thereto such that the voltage at its input terminals, i.e., across $C_1$, is instantaneously carried to unit value, then at a time $t_1$ later the voltage across the same terminals will be precisely given by $B_0$, i.e., (49). Thus, the fact that $Z_0$ is passive leads to the modulus of $B_0$ being smaller or equal to unity and an identical relation is true for $B_S$ in view of $Z_S$ being also passive.

If the resonant transfer network of FIG. 1 is unbalanced, i.e., with terminals $3'$ and $4'$ directly interconnected, the instantaneous voltage $v_a$ between terminals 3 and 4 immediately after closure of the switches $S_1$ and $S_2$ can be expressed in terms of the instantaneous voltage $v_b$ between these terminals immediately before opening of the switches by $$v_a = v_{3a} - v_{4a} = (B_{33} - B_{43})v_{3b} + (B_{34} - B_{44})v_{4b}$$
$$= B_S(v_{3b} - v_{4b}) = B_S v_b \quad (97)$$

The first expression follows from the definition of $v_a$, $v_{3a}$ and $v_{4a}$ being the instantaneous voltages across terminals 3–3' and 4–4' respectively after closure of the switches. The second expression is obtained with the help of (3) and (4), $v_{3b}$ and $v_{4b}$ being the instantaneous voltages across terminals 3–3' and 4–4' respectively before closure of the switches. The third expression is derived by using (50) and the last follows from the definition of $v_b$.

Likewise, with $q_a$ and $q_b$ the respective instantaneous total charges across $C_1$ and $C_2$ after and before closure of the switches:

$$q_a = C_1 v_{3a} + C_2 v_{4a} = (C_1 B_{33} + C_2 B_{43})v_{3b} + (C_1 B_{34} + C_2 B_{44})v_{4b} = B_0(C_1 v_{3b} + C_2 v_{4b}) = B_0 q_b \quad (98)$$

by again using (3) and (4) as well as (45) to (48).

Thus, since neither the modulus of $B_S$ nor that of $B_0$ can exceed unity for passive networks, as expected, the moduli of $v_a$ and $q_a$ cannot exceed those of $v_b$ and $q_b$ respectively.

When the resonant transfer network of FIG. 4 does not lead to such values as 1 and —1 for the dimensionless parameters $B_0$ and $B_S$ respectively, these parameters are nevertheless constants, so that the loss (for passive networks) is constant and independent of the frequency.

A general theory of resonant transfer transmissions has now been established. This covers not merely reciprocal circuits such as direct resonant transfer circuits but also so-called quasi-reciprocal circuits such as intermediate storage resonant transfer circuits where the transmissions in the two opposite directions differ only by a predetermined delay.

For certain applications of the resonant transfer, it is important that the reflections at the input and output terminals 1-1' and 2-2' (FIG. 1) should be as small as possible. This will particularly be the case when considering amplification in resonant transfer circuits. The result of imposing such conditions will be analyzed herebelow starting from the previously established results. Considering the reflection coefficient $S_{110}$ defined by (30) this may be written $$S_{110} = \frac{E - 2I_{10}R_1}{E} = h_1 - \frac{2R_1 J_3 M_1(p)}{E} = $$
$$h_1 - \frac{2h_1 R_3 (W_{44} + Z_{p4})}{(W_{33} + Z_{p3})(W_{44} + Z_{p4}) - W_{34}W_{43}}$$
(99)

The first expression for $S_{110}$ is already given in (30) while the second is readily obtained by making use of (31) and remembering that $h_1$ has been defined by (53) as the reflection coefficient between $Z_{11}$ and $R_1$. Finally, the fourth expression for $S_{110}$ follows by making use of (32), (35) and (57). A like expression can be secured for $S_{220}$ expressing the reflection at the terminals 2-2' in function of a reflection coefficient corresponding to $h_1$ but this time related to the terminating resistance $R_2$, and with $R_3$, $W_{44}$ and $Z_{p4}$ in (99) replaced in the numerator (in view of the symmetry of the denominator) only, by $R_4$, $W_{33}$ and $Z_{p3}$ respectively. It is clear from such expression as (99) that if $S_{110}$ is to be zero, the second term in the third expression should be equal to $h_1$ and this gives $$(W_{33}+Z_{p3})(W_{44}+Z_{p4}) - W_{34}W_{43} = 2R_3(W_{44}+Z_{p4}) = 2R_4(W_{33}+Z_{p3})$$
(100)

This is a double condition which must be fulfilled if there are to be no reflections at terminals 1-1' as well as at terminals 2-2'. This double condition expressed by (100) may be rewritten as the double condition $$W_{34}W_{43} = (W_{33}+Z_{p3})(W_{44}-\bar{Z}_{p4}) = (W_{44}+Z_{p4})(W_{33}-\bar{Z}_{p3})$$
(101)

in which $\bar{Z}_{p3}$ and $\bar{Z}_{p4}$ represent the complex conjugates of $Z_{p3}$ and $Z_{p4}$ respectively.

The double relation (100) or (101) expresses the con-
However, apart from such a source as E of imaginary
However, apuart from such a source as E of imaginary angular frequency $p$ connected across terminals 1-1', across these terminals may also appear components at the imaginary angular frequencies $p+nP$, with $n$ different from zero, and which are the components generated by the resonant transfer circuit due to the modulator action. Considering such reflections at other frequencies at the terminals 1-1', if these are also to be zero then, it is clear from (29) and (33) that since $S_{11n}$ must then be zero for all values of $n$ which differ from zero, then for all such values $M_1(p+nP)$ must also be zero. Then, by virtue of (58), $$R_3\left(\omega + \frac{2\pi n}{T}\right)$$

must be zero for all values of the integer $n$ different from zero. Clearly then, since the resistive part $R_{p3}$ of the pulse impedance $Z_{p3}$ can be expressed by a summation as given by (62), this resistive part $R_{p3}$ of the pulse impedance $Z_{p3}$ is merely equal to $R_3$. In other words, since twice this resistance is then equal to the sum of the pulse impedance $Z_{p3}$ with its complex conjugate $\bar{Z}_{p3}$ one may write $$2R_3 = Z_{p3} + \bar{Z}_{p3}$$
(102)

Likewise, the same consideration with respect to the absence of any reflected component at terminals 2-2' leads to $$2R_4 = Z_{p4} + \bar{Z}_{p4}$$
(103)

where $R_4$ is the resistive part of the input impedance $Z_4$ of the filter network $N_2$.

Using these two additional conditions in the double equation such as (101), wherein the impedance parameters $W_{33}$, $W_{34}$, $W_{43}$ and $W_{44}$ may be replaced in terms of the corresponding dimensionless parameters $B_{33}$, etc., in the manner expressed by Equations 20 to 23 with B defined by (24), it finally becomes:

$$B_{33}+\bar{h}_3 h_4 B_{44} = \bar{h}_3 + h_4(B_{33}B_{44} - B_{34}B_{43})$$ (104)
$$B_{44}+\bar{h}_4 h_3 B_{33} = \bar{h}_4 + h_3(B_{33}B_{44} - B_{34}B_{43})$$ (105)

Apart from the dimensionless parameters of the $B_{33}$ series, the above two conditions only include the dimensionless parameters $h_3$ and $h_4$ which are given by $$h_3 = \frac{Z_{p3} - R_{C1}}{Z_{p3} + R_{C1}}$$
(106)

$$h_3 = \frac{Z_{p3} - R_{C2}}{Z_{p4} + R_{C2}}$$
(107)

The parameters $h_3$ and $h_4$ are thus reflection coefficients which characterize the amount of departure of the pulse impedances $Z_{p3}$ and $Z_{p4}$ from the purely resistive values $R_{C1}$ and $R_{C2}$. In this way, it will be clear that the complex conjugates $\bar{h}_3$ and $\bar{h}_4$ of $h_3$ and $h_4$ which also appear in (104) and (105) are given by expressions corresponding to (106) and (107) wherein $Z_{p3}$ and $Z_{p4}$ have been replaced by their respective complex conjugates.

Taking into account the above conditions for no reflections at the two pairs of terminals 1-1' and 2-2', the transmission coefficients and more particularly the conversion coefficient $S_{21n}$ will now be calculated. Considering the value given by (37) for this coefficient, its modulus will be given by the first expression of (96). However, after dividing both the numerator and the denominator by $W_{43}$, the modulus of the so-divided denominator should be taken if one wants to cover the more general case of quasi-reciprocal circuits, which include intermediate storage resonant transfer circuits, and not merely direct resonant transfer circuits. Indeed, in the more general case of quasi-reciprocal circuits, in the relation (79) which gives the ratio between the impedances $W_{56}$ and $W_{65}$ which correspond to the parameters $W_{34}$ and $W_{43}$ in (37), $a_1$ is equal to $a_2$ and the modulus of $W_{56}$ is therefore equal to that of $W_{65}$. In this way, starting from (37) the square of the modulus of $S_{21n}$ may be written as $$|S_{21n}|^2 = \frac{R_3}{R_4}\left|\frac{W_{43}}{W_{33}+Z_{p3}}\right|^2 = \frac{R_4}{R_3}\left|\frac{W_{43}}{W_{44}+Z_{p4}}\right|^2 = $$
$$\frac{|W_{43}|^2}{|(W_{33}+Z_{p3})(W_{44}+Z_{p4})|} = \left|\frac{W_{33}-\bar{Z}_{p3}}{W_{23}+Z_{p3}}\right| = \left|\frac{W_{44}-\bar{Z}_{p4}}{W_{44}+Z_{p4}}\right|$$
(108)

wherein the first two symmetrical expressions are obtained by replacing $M_1$ and $M_2$ in function of such expressions as (58) for the square of the modulus of $M_1$ and in which use is made of (101). The third expression for the square of the modulus of $S_{21n}$ then follows immediately and bearing in mind the previous remark in relation to quasi-reciprocal circuits being such that the modulus of $W_{34}$ is equal to that of $W_{43}$, the numerator of this third expression may then be replaced by either of the two values given by (101) for the product $W_{34}W_{43}$, this leading to the last two symmetrical expressions. In the case of the direct resonant transfer, not only are the moduli of $W_{34}$ and $W_{43}$ equal to one another but these two impedances are also equal as indicated by (61). Since quasi-reciprocal circuits have been assumed, covering not only the direct resonant transfer but also the intermediate storage resonant transfer, the expression (108) is also the correct value for the square of the modulus of $S_{12,-n}(p+nP)$.

Considering ideal filters or filters approximating such conditions for resonant transfer circuits, the simplest ideal filters are those for which the pulse impedance such as $Z_{p3}$ is real and constant in the passband. The elimination of the reactive component of the pulse impedance may be secured for instance by a reactive compensation method as described in the second above mentioned reference. As previously pointed out, this constant resistance in the passband is then necessarily equal to such a resistance as $R_{C1}$ defined by (16) in the case of $Z_{p3}$. In other words, in such a case the pulse impedance reflection coefficient $h_3$ given by (106) is equal to zero and if the pulse impedance $Z_{p4}$ for the filter network $N_2$ is equal to the resistance $R_{C2}$ then $h_4$ will also be equal to zero which means that the two conditions (104) and (105) for no reflections at terminals 1–1' and 2–2' simply impose that both $B_{33}$ and $B_{44}$ should be simultaneously equal to zero. In other words, by referring to (3) and (4) this means that for each of the capacitances $C_1$ and $C_2$ (FIG. 1), the voltage after the closure of the corresponding switch $S_1$ or $S_2$ depends solely on the voltage across the other capacitance before such a closure.

Such conditions for parameters like $B_{33}$ and $B_{44}$ can be satisfied not only in the case of the direct resonant transfer but also when intermediate storage is considered, as disclosed more particularly in connection with FIG. 2. In this case, it is clear from (73) and (74) that the coefficients corresponding to $B_{33}$ and $B_{44}$ for the central part of the network of FIG. 2 between terminals 5–5' and 6–6' are equal to zero. Then, all that is necessary is that for the networks $N_{0A}$ and $N_{0B}$, the corresponding coefficients should be equal to zero. In other words, for network $N_{0A}$ the voltage amplitude $V_{3a}$ should be directly proportional to the voltage amplitude $V_{5b}$ and the voltage amplitude $V_{5a}$ should be directly proportional to the voltage amplitude $V_{3b}$;

$$V_{3a} = B_{35} V_{5b} \quad (109)$$

$$V_{5a} = B_{53} V_{3b} \quad (110)$$

wherein the dimensionless parameters $B_{35}$ and $B_{53}$ obviously correspond to $B_{34}$ and $B_{43}$ of (3) and (4). Likewise, for the network $N_{0B}$ of FIG. 2 one should have the relations $$V_{4a} = B_{46} V_{6b} \quad (111)$$

$$V_{6a} = B_{64} V_{4b} \quad (112)$$

The last four equations together with (73) and (74) therefore lead to $$V_{3a} = e^{-pT_2 - a_2} B_{35} B_{64} V_{4b} \quad (113)$$

$$V_{4a} = e^{-pT_1 - a_1} B_{53} B_{64} V_{3b} \quad (114)$$

which clearly establish that for the overall circuit of FIG. 2 (in the case of intermediate storage) the coefficients corresponding to $B_{33}$ and $B_{44}$ can also be equated to zero.

Considering again the general expression given for the conversion coefficient $S_{21n}$ in (37) when dividing both the numerator and the denominator by $W_{43}$, the denominator so divided will be an important expression which as will be discussed later determines the stability of the resonant transfer circuit. It is therefore of interest to calculate such an expression under the assumption that the no-reflection conditions are satisfied, i.e., that $B_{33}$ and $B_{44}$ are both equal to zero. Indeed, while it is possible to satisfy more or less exactly such conditions, the pulse impedances such as $Z_{p3}$ can normally only be equated to such resistance as $R_{C1}$ and this in the passband, in an approximate manner.

Before deriving an expression for the denominator of (37) divided by $W_{43}$, when assuming that both $B_{33}$ and $B_{44}$ are equal to zero, the equations from (20) to (24) lead to $$\frac{W_{33}}{R_{C1}} = \frac{W_{44}}{R_{C2}} = \frac{2-B}{B} = \frac{1+B_{34}B_{43}}{1-B_{34}B_{43}} \quad (115)$$

Using the above together with (21) and (22) the expression under investigation then becomes $$\frac{(W_{33}+Z_{p3})(W_{44}+Z_{p4}) - W_{34}W_{43}}{W_{43}} =$$

$$\frac{(Z_{p3}+R_{C1})(Z_{p4}+R_{C2})(1-B_{34}B_{43}h_3h_4)}{2B_{43}R_{C1}} \quad (116)$$

When both $B_{33}$ and $B_{44}$ are equal to zero, (108) may also be written as $$|S_{21n}|^2 = \left|\frac{B_{34}B_{43} - \bar{h}_3}{1 - \bar{h}_3 B_{34} B_{43}}\right| = \left|\frac{B_{34}B_{43} - \bar{h}_4}{1 - \bar{h}_4 B_{34} B_{43}}\right| \quad (117)$$

showing that when $h_3$ or $h_4$ are equal to zero that is to say when the pulse impedance $Z_{p3}$ is equal to $R_{C1}$ in the respective passband of the filter or the pulse impedance $Z_{p4}$ is equal to $R_{C2}$ in the passband of the other filter, the square of the modulus of the conversion coefficient $S_{21n}$ as well as that for the reverse direction of transmission, is simply equal to the modulus of the product $B_{34}B_{43}$:

$$|S_{21n}|^2 = |S_{12,-n}|^2 = |B_{34}B_{43}| \quad (118)$$

The relations (104) and (105) were used to show that if both $h_3$ and $h_4$ are equal to zero, then both $B_{33}$ and $B_{44}$ should be zero. It is interesting to note that when assuming the reverse, i.e., that both $B_{33}$ and $B_{44}$ are equal to zero then these two conditions indicate that $h_3$ and $h_4$ can only differ from zero if the square of the modulus of $B_{34}B_{43}$ is equal to unity, or in other words by virtue of (118) if the circuit does not exhibit any loss or gain.

The stability of a general resonant transfer circuit such as disclosed in FIG. 1 or in FIG. 2 will now be discussed. In the following it will be assumed that both $B_{33}$ and $B_{44}$ are equal to zero this in order to have no reflections. Also, it will be assumed that the resonant transfer circuit left on itself, i.e., the circuit of FIG. 4, is stable. By virtue of (3) and (4) this demands that $B_{34}$ and $B_{43}$ should have no poles in the right half-plane. Indeed, any pole of $B_{34}$ for instance corersponds to such a value of the complex variable $p$ that $V_{3a}$ could be different from zero even if both $V_{3b}$ and $V_{4b}$ are equal to zero.

Then, by considering such conversion coefficients as $S_{21n}$ given by (37) it is seen that an instability can only be produced if the expression (116) appearing in (37) has a zero in the right half-plane. Considering (116), since neither the factor $Z_{p3}+R_{C1}$ nor the factor $Z_{p4}+R_{C2}$ can have a zero in the right half-plane, a discussion of stability is finally centered on the location of the zeros for the expression $$1 - B_{34}B_{43}h_3h_4 \quad (119)$$

Before discussing the zeros of the above expression, some further remarks may be made regarding the product $B_{34}B_{43}$. If the circuit is quasi-reciprocal as will be admitted hereafter and if the filters are the universal ideal filters previously defined, i.e., in practice filters which sufficiently approach these conditions, as indicated by (118) the modulus of $B_{34}B_{43}$ is in the passband, equal to the square of the modulus of the conversion coefficient such as $S_{21n}$. Thus in the passband the modulus $B_{34}B_{43}$ will be less than unity or equal to unity if there is no gain for the overall circuit and otherwise it will be larger than unity. Additionally, in practical resonant transfer circuits, the modulus of $B_{34}B_{43}$ is at real frequencies, independent of frequency at least ideally. Indeed in the case of the direct resonant transfer this parameter is a constant and this parameter which in the absence of reflection ($B_{33}=B_{44}=0$) corresponds to $V_{3a}V_{4n}/V_{3b}V_{4b}$ is equal to a constant multiplied by $e^{-pT}$, this in view of (113) and (114) and remembering from FIGS. 1 and 2 that $T_1+T_2=T$.

A study of the zeros of the expression (118) will now be made by considering the plane of the complex frequency variable $p$ and more particularly the right half-plane represented in FIG. 10. The expression (119) which has now been obtained is clearly similar to the well known expression occurring in the theory of feedback amplifiers, the product $B_{34}B_{43}$ coresrponding to the gain factor and the product $h_3h_4$ corresponding to the feedback factor. As in the theory of feedback amplifiers, the product constituting a second term of (119) has no pole in the right half-plane, the vertical axis limiting said half-plane on its left being the real frequency axis. Thus, the absence of zeros in the right half-plane for the expression (119) is still equivalent to the condition that upon the complex frequency variable $p$ describing the closed contour limiting the right half-plane, then the product $B_{34}B_{43}h_3h_4$ should not enclose the point $B_{34}B_{43}h_3h_4=1$.

FIG. 10 shows the right half-plane for the complex frequency variable $p$ with an infinite semicircle centered at the origin and having a sufficiently large radius.

In the whole of the right half-plane including the limiting vertical imaginary axis for $p$ (real frequency axis), the coefficients $h_3$ and $h_4$ cannot have a modulus which exceeds unity but the phase of such coefficients will in general strongly vary. It should be noted that these coefficients are defined by (106) and (107) in terms of the respective pulse impedances $Z_{p3}$ and $Z_{p4}$ and that accordingly these coefficients are periodic functions of frequency as is the case of the pulse impedances. Thus, if $B_{34}B_{43}$ is a constant as in the case of the direct resonant transfer, enclosing the point $B_{34}B_{43}h_3h_4=1$ is in any event excluded when the modulus of $B_{34}B_{43}$ is smaller than unity, i.e., if the circuit does not show a gain. On the other hand, if the modulus exceeds unity, this point $B_{34}B_{43}h_3h_4=1$ may be enclosed. In view of the continual variation of the phase of $h_3h_4$, i.e., not only the periodic variation along the vertical real frequency axis but also the nonperiodic variation on the infinite semicircle, this point will generally be enclosed as soon as the modulus of $B_{34}B_{43}h_3h_4$ exceeds unity at any point.

FIG. 11 shows by way of example a plot of the complex variable constituted by the product $h_3h_4$ upon the complex frequency variable $p$ of FIG. 10 describing the semicircle contour corresponding to the infinite right half-plane. The two circles indicated in FIG. 11 correspond respectively to the circle of unit radius (outer circle) passing through the point 1 and to the maximum amplitude taken by the product $h_3h_4$ when plotting such a curve, as indicated by the radius of the inner circle. Accordingly, stability of the resonant transfer circuit is only guaranteed with certainty if the modulus of $B_{34}B_{43}$ does not exceed a given value which corresponds to the inverse of the maximum value of the modulus of the product $h_3h_4$ indicated by the radius of the inner circle on FIG. 11.

In principle, stability is not excluded when this condition is not satisfied and this corresponds then to the well known case of conditional stability in feedback amplifiers. In the present case of resonant transfer, such conditional stability is however hardly possible when considering the case of resonant transfer with intermediate storage. As previously noted in relation to FIG. 2 and the Equations 113 and 114, the corresponding product $B_{34}B_{43}$ thus includes a constant factor multipled by $e^{-pT}$ and the latter will thus contribute a phase equal to $\omega T$ along the vertical real frequency axis of FIG. 10 whereas it becomes zero on the infinite semicircle of the right half-plane.

In any event, in view of the unavoidable imperfections of any practical circuit, the gain factor $B_{34}B_{43}$ always tends towards zero when $\omega$, the angular frequency, tends towards infinity. The variation in the modulus of this gain factor is however accompanied also by a phase variation and the latter is hardly controllable. All this means in practice that in general the really useful criterion for stability of a resonant transfer circuit is that the modulus of the gain factor $B_{34}B_{43}$ should not exceed a predetermined value which is the inverse of the radius of the inner circle shown in FIG. 11. In view of the periodicity of the pulse impedance reflection coefficients $h_3$ and $h_4$ which as given by (106) and (107) depend on the respective pulse impedances $Z_{p3}$ and $Z_{p4}$, the maximum value of the modulus of the products $h_3h_4$ which should be taken into account in order to assess the maximum allowable gain is that for the frequencies comprised between zero and half the sampling frequency.

Assuming for instance that it is desired to compensate losses in a resonant transfer circuit and that such losses occur in the actual resonant transfer circuit, i.e., that of FIG. 4, then they may be compensated so that the product $B_{34}B_{43}$ is restored to the value which it would have in the absence of losses. Such an amplification arrangement cannot have any effect on the overall stability of the resonant transfer circuit provided of course that the arrangement (FIG. 4) is stable on itself as previously assumed. Otherwise, it is necessary to have pulse impedance reflection coefficients such as $h_3$ and $h_4$ which are sufficiently small. It is to be noted that the method for compensating the pulse impedance of filters which has been described in the second above mentioned reference is of no avail here, since it only produces a constant and purely resistive impedance within the passband of the filter. Clearly, outside this passband a pulse impedance reflection coefficient such as $h_3$ will strongly differ from zero and its maximum will be unity outside the passband so that a gain factor $B_{34}B_{43}$ larger than unity cannot be obtained with such a filter.

The ideal requirement is that at least one of the two filter networks $N_1$ and $N_2$ appearing in the general resonant transfer circuit of FIG. 1 should have a pulse impedance such as $Z_{p3}$ for $N_1$ which is identically equal to a constant resistance at all frequencies. In such a case, as previously pointed out, this constant resistance is $R_{c1}$ for $Z_{p3}$ and the reflection coefficient $h_3$ is then zero. This then means that in principle an infinite gain can be secured. In practice such a gain, i.e., a value for $B_{34}B_{43}$ which exceeds unity, will be determined by the accuracy with which the pulse impedance $Z_{p3}$ equals the resistance $R_{c1}$ at all frequencies.

A practical way to achieve this will now be explained by referring to FIGS. 12 to 18.

In these figures one will particularly consider filter networks such as $N_1$ and $N_2$ of FIG. 1 which are ideal open circuit filters, that is to say filters whose input impedance such as $Z_3$ for $N_1$ is of the minimum reactance type and such that the open circuit voltage transfer coefficient $M_1$ which is defined by (58) is a constant value in the passband and zero outside. Thus, the input resistance $R_3$ (55) of such a filter as $N_1$ is proportional to the terminating resistance $R_1$ and to the square of the open-circuit voltage transfer coefficient $M_1$. This type of filter is also considered in the second above mentioned reference and if the input resistance such as $R_3$ has the characteristic mentioned, when $Z_3$ is an input impedance of the minimum reactance type, then the imaginary component of this input impedance, i.e., $X_3$ (55) can be computed using Bode's relation between the real and imaginary parts of a minimum reactance type function.

Using for instance the series expression for $X_{p3}$, the reactive component of the pulse impedance $Z_{p3}$ defined in (14), and which is thus analogous to (62) giving the series expression for the resistive component $R_{p3}$ of the pulse impedance, i.e., $$X_{p3} = \sum_{n=-\infty}^{\infty} X_3\left(\omega + \frac{2\pi n}{T}\right) = \sum_{n=-\infty}^{\infty} X_3(f+nF) \quad (120)$$

where $f$ is the frequency and $F$ the sampling frequency, the following expression can be secured for the normalized value of the pulse impedance of such a network as $N_1$ $$1 - \frac{j}{\pi}\log_e\frac{1+b}{1-b} |b|<1 \quad -\frac{j}{\pi}\log_e\frac{b+1}{b-1} |b|>1 \quad (121)$$

In the above, $b$ is a transformed and normalized frequency variable which will be recognized as that variable already introduced in Equation 15 of the second above mentioned reference, the reactive part of the normalized impedance having also been given in that patent as Equation 12". Thus, this transformed and normalized frequency variable $b$ can be defined as $$b = \frac{\tan \frac{\omega T}{2}}{\tan \frac{\omega_c T}{2}} = \frac{\tan \pi f T}{\tan \pi f_c T} \quad (122)$$

showing that $b$ is thus equal to unity when the angular frequency $\omega$ is equal to the angular cut-off frequency $\omega_c$ or when the frequency $f$ is equal to the cut-off frequency $f_c$. It is only in the particular case of the cut-off frequency $f_c$ being equal to half the sampling frequency $1/2T$ that the expression (121) becomes unity at all frequencies, i.e., for all values of $b$ since $\tan \pi f_c T$ is then equal to infinity. In the general case when the cut-off frequency $f_c$ is not equal to half the sampling frequency $1/2T$, then using the reactive compensation method of the above U.S. Patent No. 3,187,100, it is possible to obtain a reactance such that its pulse reactance approximates with any desired degree of accuracy the reactive component of the expression (121) in the passband of the filter, i.e., when the modulus of $b$ is smaller than unity. In this way, a substantially constant and purely resistive pulse impedance can be secured in the passband for the compensated filter, i.e., with a compensating reactance two-terminal network in series therewith on the open circuit or high frequency side. Outside the passband however, the normalized pulse impedance will still be different from unity and for the reasons previously discussed, then, it is not possible to secure amplification if such a pulse impedance reflection coefficient as $h_3$ (106) can then reach unity value.

Considering now bandpass filters, and more particularly single sideband bandpass filters one cut-off frequency of which corresponds to the sampling frequency F or a multiple thereof and the other cut-off frequency of which is separated therefrom by $f_c$, if these are also of the ideal open circuit type so that they have a normalized input resistance equal to unity in the passband and equal to zero outside, then the double expression (121) is still applicable to such ideal bandpass filters.

FIG. 12 represents the resistive component of the pulse impedance of such a bandpass filter. By way of example its passband will be assumed to occupy the frequency range from $2F-f_c$ to $2F$. In FIG. 12, the dotted outline together with the full outline represent part of the overall characteristic for the resistive component of the normalized pulse impedance, whereas the full outline only represents the normalized input resistance characteristic of the filter, the plot being only shown for positive values of $f$ in view of the symmetry of such characteristics about the origin. As assumed in this particular example, the normalized input resistance is therefore equal to unity from $2F-f_c$ to $2F$ while it is zero at all other positive frequencies.

In other words, considering (62) when the modulus of $$f + nF \text{ or } \omega + \frac{2\pi n}{T}$$

is located between the values $2F-f_c$ and $2F$ or $$\frac{4\pi}{T} - \omega_c$$

and $4\pi/T$ respectively, $R_3$ will be equal to unity. Therefore, using this expression (62) the resistive component of the pulse impedance can be plotted as shown in FIG. 12 for part of the positive frequency range, the characteristic being symmetrical for negative frequencies. The characteristic is plotted by assigning to the integer $n$ in (62) all its positive and negative values from minus infinity to plus infinity. Choosing as assumed by way of example ths actual passband of the filter as the lower sideband of $2F$, a unit value for the normalized resistive component of the pulse impedance will be obtained only when $f$ satisfies the following inequalities $$2F - f_c < f + nF < 2F - 2F + f_c > f + nF > 2F \quad (123)$$

Thus it is clear from (62) and (123) that the unit value obtained for the normalized resistive part of the pulse impedance from e.g., $2F$ to $2F + f_c$ will be obtained when $n$ has the particular value of $-4$, i.e., second inequality of (123). There is no difficulty in showing that exactly the same characteristic as that shown in FIG. 12 for the resistive component of the pulse impedance (dotted outline plus full outline) can be secured irrespective of the location of the passband. All that is required is that one of the cut-off frequencies should correspond to a multiple of the sampling frequency F.

Indeed, FIG. 13 shows an identical plot for this resistive component of the pulse impedance although it has this time been assumed that the passband of the filter has a lower cut-off frequency equal to a multiple of the sampling frequency, in this particular case this is again chosen by way of example as $2F$.

The above considerations concern ideal open circuit bandpass filters for single sideband modulation (FIGS. 12 and 13) but they can also be extended to double sideband modulation. In such a case two conversion coefficients $S_{21, n}$ and $S_{21, -n}$ must be considered and such that their moduli should be equal to one another. Since as indicated by (86) the square of the modulus of such a conversion coefficient as $S_{21, n}$ is proportional to the resistive component of the input impedance of the filter concerned, if for instance $N_2$ of FIG. 1 is such a double sideband bandpass filter then the equality between the moduli of the two conversion coefficients one of order $n$ and the other of order $-n$ gives $$R_4\left(\frac{2\pi n}{T} + \omega\right) = R_4\left(\frac{2\pi n}{T} - \omega\right) \quad (124)$$

This means that in the case of a double sideband modulation the lower limit which is $R_3(\omega)$ for the resistive component of the pulse impedance such as $R_{p3}$ as given by (62) is now replaced by the following limit still considering that it is the network $N_2$ of FIG. 1 which is the double sideband bandpass filter $$R_{p4} = \sum_{n=-\infty}^{\infty} R_4\left(\omega + \frac{2\pi n}{T}\right) = 2R_4\left(\frac{2\pi n}{T} + \omega\right) = 2R_4\left(\frac{2\pi n}{T} - \omega\right) \quad (125)$$

By virtue of this, and using the same considerations which led to the conditions for so-called universal ideal filters, e.g., equations 89 and 90, in the case of such universal ideal filters but this time for double sideband modulation, it will now be necessary that twice the resistive component of the input impedance of such a bandpass filter $N_2$ should be equal to the common resistance value, i.e., the input impedance $R_3(\omega)$ of the single sideband bandpass or low pass filter $N_1$. This leads to the squares of the moduli of $S_{21, n}$ and $S_{21, -n}$ being both equal to $1/2$ leading to a loss-less double sideband modulation.

In this way, it can be shown that exactly the same characteristic as what is shown in FIGS. 12 and 13 can also be secured for bandpass filters occupying the two sidebands, i.e., with a lower cut-off frequency which is $f_c$ below a multiple of the sampling frequency F and an upper cut-off frequency which is $f_c$ above it.

FIG. 14 shows such a plot and in this case the normalized value of the resistive component of the input impedance is equal to one half. In FIG. 14 it has been assumed by way of example that the passband of the double sideband filter extends from $2F-f_n$ to $2F+f_c$.

With the help of FIGS. 15, 16 and 17, a different type of bandpass filters will now be examined. These bandpass filters are such that in the case of single sideband modulation, one of the cut-off frequencies corresponds to an odd multiple of half the sampling frequency while the passband is complementary with respect to the passband $f_c$ for the bandpass filters of FIGS. 12 and 13. In other words, for the single sideband bandpass filters whose characteristics are given in FIGS. 15 and 16, the frequency range of the passband is equal to $F+f_c$. If these filters satisfy the prescriptions previously given in relation to those described by the characteristics of FIGS. 12, 13 and 14, then the characteristics shown in FIGS. 15 and 16 are obtained for the resistive component of their pulse impedance. By way of example in FIG. 15, the passband has been assumed to lie between $F+f_c$ and $3F/2$ while in FIG. 16, the passband of the filter extends from this last odd multiple of half the sampling frequency to the $2F-f_c$.

Again, as shown in FIG. 17, the reasoning can be extended to double sideband bandpass filters whose passband is centered around an odd multiple of half the sampling frequency e.g., $3F/2$, this provided the normalized resistive component of their input impedance is taken as one half.

It will be remarked that any of the characteristics of FIGS. 15, 16 and 17 is complementary with respect to any of the characteristics of FIGS. 12, 13 and 14 in the sense that by adding such a pair of characteristics together, the resistive component of the combined pulse impedance is clearly equal to unity at any frequency.

Moreover, by the same reasoning which was used in the second above mentioned reference to develop an expression for the pulse impedance of an ideal open circuit lowpass filter, the normalized expressions for the pulse impedances of the bandpass filters defined by FIGS. 15, 16 and 17 can be written as $$\frac{j}{\pi} \log_e \frac{1+b}{1-b} |b|<1$$

$$1+\frac{j}{\pi} \log_e \frac{b+1}{b-1} |b|>1 \qquad (126)$$

wherein the first purely reactive expression corresponds to a modulus of $b$, the normalized transposed frequency variable which is smaller than unity whereas the second expression, for a modulus of $b$ larger than unity, is the normalized passband pulse impedance. By adding (121) to (126) it is seen that the two normalized pulse impedance characteristics are fully complementary with respect to unity and this at any frequency.

FIG. 18 shows how in this manner a filter network such as $N_1$ of FIG. 1 may be realized so that its pulse impedance may then be identically equal to a prescribed resistance at all frequency and so that in any case its pulse impedance may have a resistive component outside the passband. The network $N_1$ is composed of a first filter network $N_{1A}$ which may be a low-pass or a bandpass filter having a characteristic of the type shown in FIGS. 12, 13 or 14. On the open circuit or high frequency side, $N_{1A}$ is directly connected to terminal 3' but its other terminal 3A is connected to terminal 3 through a 2-terminal network which is constituted by the complementary filter $N_{1B}$ terminated by the resistance $R'_1$. With such a complementary filter having a characteristic corresponding to one of those of FIGS. 15, 16 or 17 the desired pulse impedance characteristic may be secured between terminals 3 and 3' with the important result that amplification may now be achieved in a resonant transfer circuit without reflections and without instability, the measure of amplification depending on the accuracy with which the required compensation to obtain a purely resistive pulse impedance in and outside the passband of $N_{1A}$ can be obtained.

For the filters so far discussed with the help of FIGS. 12 to 17, as indicated by the characteristics it has been assumed that both the uncompensated filter, i.e., $N_{1A}$ of FIG. 18 and the compensating and resistive determined filter $N_{1B}$ had ideally sharp cut-offs. Apart from the difficulties of realizing such ideal filters, it is clear that the slightest mismatch between two characteristics such as those of FIGS. 12 and 15 will necessarily result in the overall compensated filter $N_1$ of FIG. 18 no longer exhibiting the desired constant value for the resistive component of its pulse impedance at terminals 3–3'. As it is the modulus of the minimum value of the reflection coefficient corresponding to such a pulse impedance i.e., $h_3$ (106) which determines the amount of amplification which can be secured, as previously discussed in regard to FIG. 11 and the expression (119), it is desirable to avoid such sharp cutoffs and instead, to secure sloping edges for such characteristics as those of FIGS. 12, 13 and 14 as well as for the complementry characteristics of FIGS. 15, 16 and 17.

FIG. 19 indicates a characteristic corresponding to that of FIG. 12 but with sloping, e.g., linear, edges and where it has been assumed this time that a low-pass filter (full outline referring to its input resistance going through zero frequency) is desired.

FIG. 20 shows the characteristic complementary to that of FIG. 19 and accordingly reversed sloping edges are shown. The two characteristics of FIGS. 19 and 20 are still complementary at all frequencies with respect to unity as e.g., those of FIGS. 12 and 15, but due to the sloping edges of complementary values a certain amount of shift in the characteristics is allowed before the combined resistive part of the pulse impedance drops to zero. Thus, one may reckon suitable tolerances and in particular a predetermined nonzero minimum value for this resistive component outside the passband of $N_1$. Such characteristic for the resistive components of the pulse impedance as shown in FIG. 20 may be obtained in various ways which are shown in the following figures.

Figure 23:
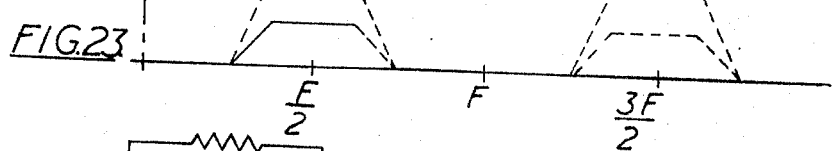

Finally, FIG. 23 shows a complementary bandpass filter of the double sideband type in which the lowest possible location for the passband has again been assumed, i.e., centered around $F/2$.

Figure 19:
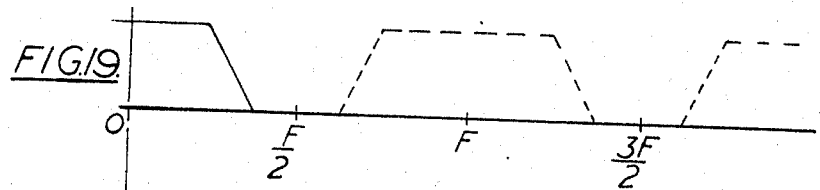
Figure 20:
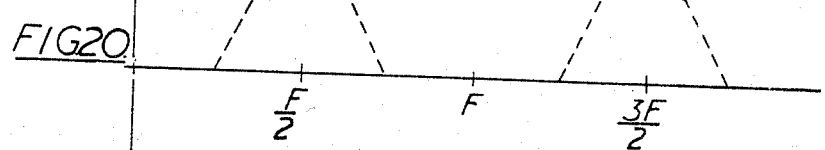
Figure 21:
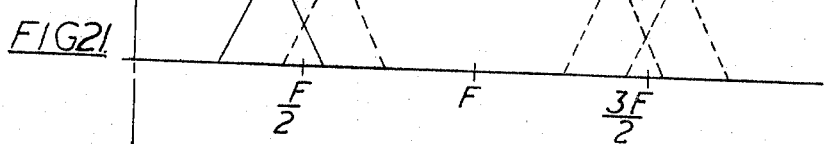
FIG. 21 shows how the trapezoidally shaped characteristic of FIG. 20 may be achieved with the help of a bandpass filter having one nominal cut-off frequency at $F/2$, i.e., half the sampling frequency, and a lower cut-off frequency corresponding to that of the low-pass filter whose characteristic is shown in FIG. 19.
Figure 22:
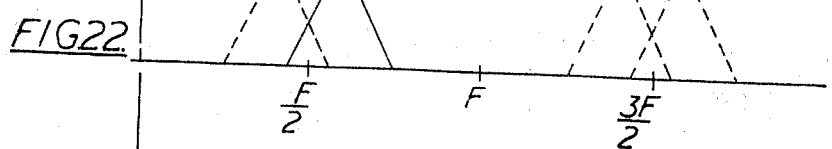
FIG. 22 shows an alternative way in which the complementary bandpass filter now uses half the sampling frequency as its nominal lower cut-off frequency.

As already discussed in the second above mentioned reference especially from the term of view of stability it will generally be of interest to choose the solution for the compensating network which is centered around the lowest frequency. In other words, from that aspect a compensating bandpass filter having a characteristic as shown in FIG. 21 will be the most desirable, this to compensate either a low-pass filter having the characteristic shown in FIG. 19 or any of the bandpass filters having characteristics based on those of FIGS. 12, 13 and 14.

As the transmission characteristic is primarily determined by the network $N_{1A}$ of FIG. 18, it will generally be of interest to choose a simpler network for $N_{1B}$ since the latter plays only a correcting function.

Figures 24, 25:
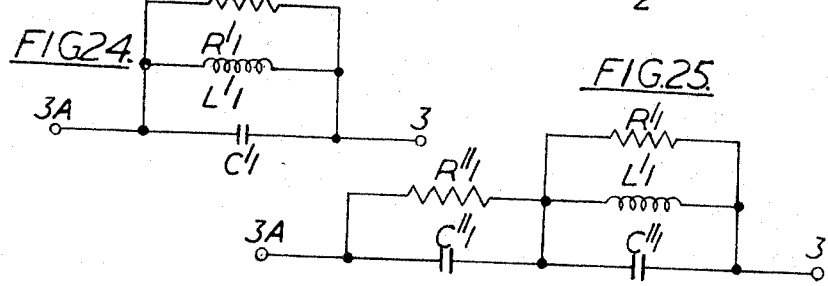

FIG. 24 shows the simplest configuration for a complementary compensating bandpass filter corresponding to such a characteristic as that of FIG. 1. As shown, the 2-terminal network to be connected between terminals 3A and 3 consists in an antiresonant circuit comprising the inductance $L'_1$ and the capacitor $C'_1$ which are shunted by the resistance $R'_1$. Thus, this compensating network is similar to that shown in the second above mentioned reference, except that a resistance $R'_1$ is now present.

Bandpass filters of the ideal open-circuit type have been considered in relation to FIGS. 12 and 13. The cut-off frequencies of such filters were however chosen in such a way that either the lower or the upper cut-off frequency was a multiple of the sampling frequency, including zero frequency in the case of a low-pass filter, i.e., FIG. 19. The compensating circuits described above can also be used in the case of bandpass filters of a different type wherein the upper or the lower cut-off frequency, i.e., FIG. 12 or FIG. 13 respectively, is no longer equal to a multiple of the sampling frequency but is at a distance $f_c$, therefrom, in such a way that the passband of such bandpass filters extends on one side of the associated harmonic of the sampling frequency. In other words, in the case of the bandpass filter occuping the lowest possible frequency interval, its lower cut-off frequency is $f_c$, while its upper cut-off frequency is $f_c$, both being smaller than F/2. In such a case, expressions corresponding to those of (121) and of (126) for the filters corresponding to FIGS. 12, 13 and 14 and those of FIGS. 15, 16 and 17 respectively, may be established for the normalized pulse impedance. These are now given by $$\frac{j}{\pi} \log_e \frac{1+b'}{1-b'} - \frac{j}{\pi} \log_e \frac{1+b}{1-b} |b'|<1 |b|<1$$

$$1 + \frac{j}{\pi} \log_e \frac{b'+1}{b'-1} - \frac{j}{\pi} \log_e \frac{1+b}{1-b} |b'|>1 |b|<1$$

$$\frac{j}{\pi} \log_e \frac{b'+1}{b'-1} - \frac{j}{\pi} \log_e \frac{b+1}{b-1} |b'|>1 |b|>1 \quad (127)$$

wherein $b'$ is an additional transposed and normalized frequency variable, the normalization being this time made with respect to tan $\pi f_c$, T, i.e., $$b' = \frac{\tan \frac{\omega T}{2}}{\tan \frac{\omega_c' T}{2}} = \frac{\tan \pi f T}{\tan \pi f_{c'} T} \quad (128)$$

instead of with respect to tan $\omega_c T$ as for $b$ identified by (122).

By comparing (121), (126) and (127) it will be seen that in the $b$ frequency domain, (121) represents the input impedance of a low-pass filter, that (126) represents the input impedance of a high pass filter while (127) corresponds to the impedance of a bandpass filter. The filters of FIGS. 15 to 17 characterized by (126) are suitable for a partial compensation of the filters characterized by (127). Indeed, by adding the expressions (126) and (127) for all values of the variables, one obtains:

$$\frac{j}{\pi} \log_e \frac{1+b'}{1-b'} |b'|<1$$

$$1 + \frac{j}{\pi} \log_e \frac{b'+1}{b'-1} |b'|>1 \quad (129)$$

which now only depends on the transposed normalized variable $b'$ which is associated with the cut-off frequency $f_c'$. Thus, the filters of FIGS. 15 to 17 permit to correct those characterized by (127) on the side of the cut-off frequency $f_c$. But the remaining partially compensated characteristic defined by (129) is clearly of the same type as that defined by (126) so that filters of FIGS. 12 to 14 characterized by a resistive component for their pulse impedance which is defined by (121) may be used to obtain the required supplementary correction around the cut-off frequency $f_c'$.

It should also be remarked that by transforming the variable $b'$ into $-1/b$, the characteristic of (129) becomes that of (121) and this transformation corresponds to that between high-pass and low-pass structures which implies that inductances and capacitances are interchanged.

In the second above mentioned reference, the compensating reactance to be connected in series with an uncompensated low-pass filter had to be inductive at low frequency in addition to being capacitive at high frequency as required for the resonant transfer using capacitances as reactive energy storage devices. In this manner, the reactive compensating 2-terminal network was of the type comprising a plurality of antiresonant circuits in series. Alternatively, using a high-pass ladder structure, on the input side to be connected in series with the uncompensated filter, the latter had to start with a shunt inductance and to end with the last series capacitance short-circuited in parallel across the previous shunt inductance giving an even number of reactive elements. In the case of such bandpass filter as last discussed, with the two cut-off frequencies $f_c$ and $f_c'$, for the compensation on the side of the cut-off frequency $f'_c'$, i.e., (129), in view of the above mentioned transformation leading to an exchange between the inductances and the capacitances, clearly then the latter structure for the compensating reactance and accordingly for the compensating terminated filter will be of the type starting with a shunt capacitance followed by a series inductance, etc., since it need no longer be inductive at low frequency though it remains capacitive at high frequency. When, with such structures one may either end it with the last series inductance short-circuited in parallel across the previous capacitance or with the last series inductance in series with the last shunt capacitance in the case of a reactive structure which this time may include an odd number of elements. For the latter structure, the simplest circuit will thus be a capacitor shunted by a terminating resistance and such a compensating circuit will be applicable for instance to an original bandpass filter having a lower cut-off frequency $f_c'$ above DC and a higher cut-off frequency $f_c$ below F/2.

FIG. 25 shows a circuit permitting to compensate the resistive component of the pulse impedance of $N_{1A}$ (FIG. 18). Compensating network $L'_1 C'_1 R'_1$ corresponding to that of FIG. 24 has one terminal connected to 3 and performs the correction due to $f_c$ being smaller than F/2. Its other terminal is connected to terminal 3A through the compensating network formed by capacitor $C''_1$ shunted by resistance $R''_1$ which deals with the correction due to $f_{c'}$ being larger than 0. Such a bandpass filter with a cut-off frequency $f_{c'}$ above DC will be encountered in practice due to the high-pass action of the subscriber line transformer which is part of the line circuit in a telephone system.

Figure 26:
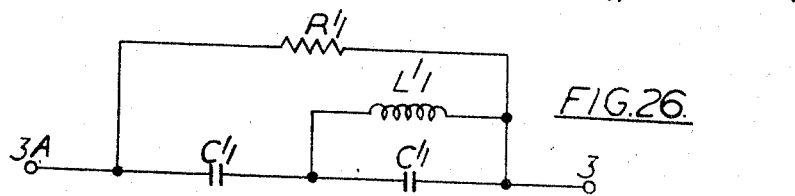

FIG. 26 shows a modification of the circuit of FIG. 25 in which instead of using two terminating resistances, only one, i.e., $R'_1$ is used between terminals A3 and 3. Though there is one element less than in the circuit of FIG. 25, the number of reactive elements is the same and the circuit of FIG. 26 will nevertheless permit a suitable correction of the basic filter network $N_{1A}$ of FIG. 18 which will generally be designed as an open circuit filter having an input impedance of the minimum reactance type.

Considering FIG. 26, since there is only one terminating resistance $R'_1$, one may consider that there is in effect only a single reactive filter network $N_{1B}$ to perform the correction of the impedance offered by the network $N_{1A}$ when the latter is a bandpass filter having a resistive component for its pulse impedance which is of the type given by (127). Instead of the previous reasoning for the compensation of the normalized characteristic of this last expression in order to reach unit value at all frequencies for the compensated characteristic, the expression (127) may be rewritten as $$1 - \frac{j}{\pi} \log_e \frac{1+b''}{1-b''} |b''|<1$$

$$-\frac{j}{\pi} \log_e \frac{b''+1}{b''-1} |b''|>1 \quad (130)$$

which is again of the type given by (121) but this time it is a function of the normalized transformed variable $b''$ which is given by $$b'' = \frac{1-bb'}{b-b'} = 1 + \frac{(1-b)(1+b')}{b-b'} = -1 + \frac{(1+b)(1-b')}{b-b'}$$

(131)

in function of the previous normalized transformed parameters $b$ and $b'$. The second and the third expressions given above for $b''$ including a first term equal to 1 and to $-1$ respectively permit to justify the limits for the two expressions for (130) depending on whether the modulus of $b''$ is smaller or larger than zero. Indeed, the second and third expressions for $b''$ indicate that when the modulus of $b'$ is larger than unity while that of $b$ is smaller than unity, i.e., second expression of (127) corresponding to the passband, with $b'$ larger than $+1$, the second term of the second expression of (131) is necessarily negative, while with $b'$ more negative than $-1$, the second term of the third expression of (131) is necessarily positive. Thus, this means that the first fourth expression of (130) corresponding to the second expression of (127) can only be true when the modulus of $b''$ is smaller than unity.

Accordingly, a bandpass filter of the last type defined and having a resistive component for its pulse impedance which is characterized by (127) can in fact be handled as a bandpass or low-pass filter of the earlier type having the characteristic defined by (121) provided a suitable transformation is made. This means that the network having the characteristic defined by (126) can also be used for correcting the bandpass filters corresponding to (127) or (130), but after having determined a suitable network in terms of the normalized transformed variable $b''$, this network will have to be transformed using the transformation defined by (131). This will then produce the correcting network defined in terms of the normalized transformed variables $b$ and $b'$ or in other words by virtue of (121) and (128) in terms of the transformed variable $\tan \omega T/2$. Finally, in the same manner as disclosed in the above mentioned second reference, the network defined in terms of the transformed variable $\tan \omega T/2$ will be translated into the actual network $N_{1B}$ of FIG. 18 i.e., in terms of the frequency variable $f$.

The transformation defined by (131) transforms an inductance into a series resonant circuit and a capacitance into a parallel resonant circuit respectively. Hence, if the characteristic defined by (130) is corrected by a 2-element filter, i.e., an antiresonant circuit, in view of the required transformation the actual network will then include as reactive elements, an antiresonant circuit shunted by a series resonant circuit or any of its well known equivalent forms.

As already discussed in the second above mentioned reference, it can be shown that the overall capacitance offered by a filter compensated in the manner described, e.g., the capacitance measured at high frequency between terminals 3–3' of FIG. 18 and comprising for instance the serial combination of the capacitors $C'_1$, $C''_1$ of FIG. 25 or 26 together with the capacitance offered by $N_{1A}$ should be equal to half the sampling period divided by the passband input resistance of an ideal open-circuit single sideband filter.

Thus, it has been shown that suitable filters could be designed to provide a resistive component for the pulse impedance in the neighborhood of odd multiples of half the sampling frequency whereas an ideal open-circuit filter which has a cut-off frequency lower than half the sampling frequency and this for practical reasons, does not exhibit such a resistive component. With such filters offering such a pulse impedance resistive component outside their passband, it is then possible to have values of $B_{34}B_{43}$ which are larger than unity. This means that amplification in resonant circuits can thus be achieved without oscillations and without reflections at the two ends of a transmission circuit with amplification means in the high frequency path so that these may be used in common in a time division multiplex arrangement. Bidirectional amplifiers using negative resistances such as disclosed in the U.S. Patent No. 3,117,185, and in the U.S. Patent No. 3,324,247, entitled "Resonant Transfer Network," and adapted to time-division multiplex amplification may in particular be used.

Figure 4:
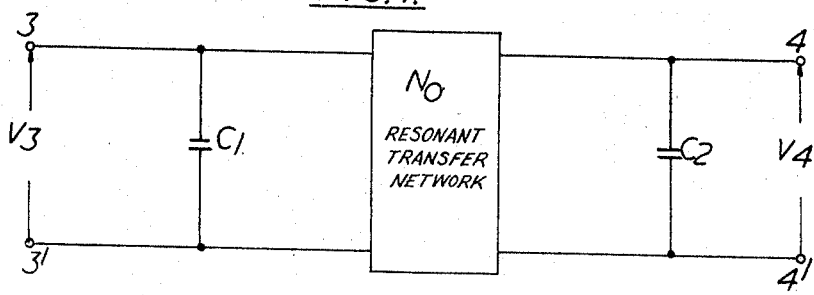
Figure 5:
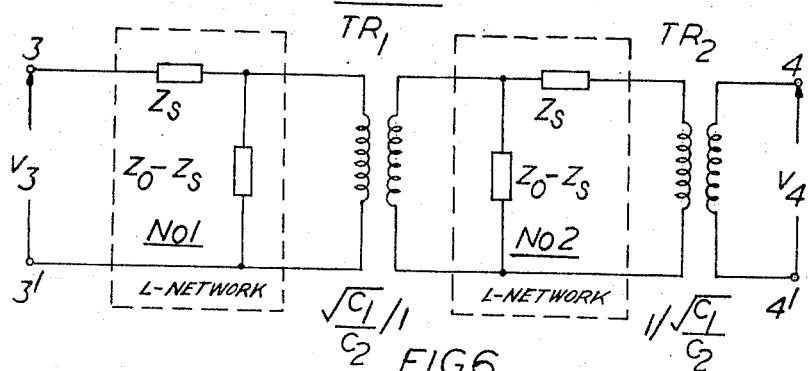
Figure 6:
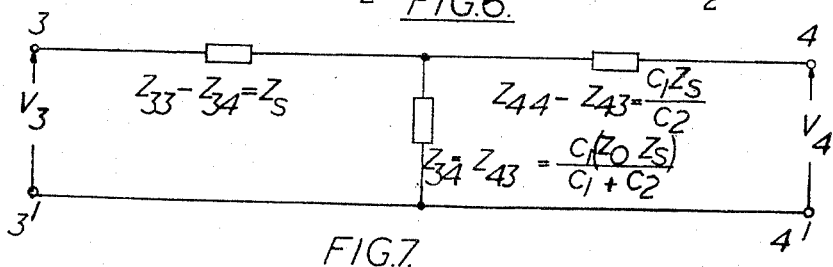
Figure 7:
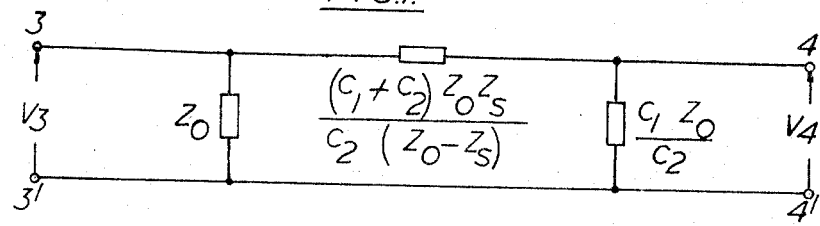
Figure 8:
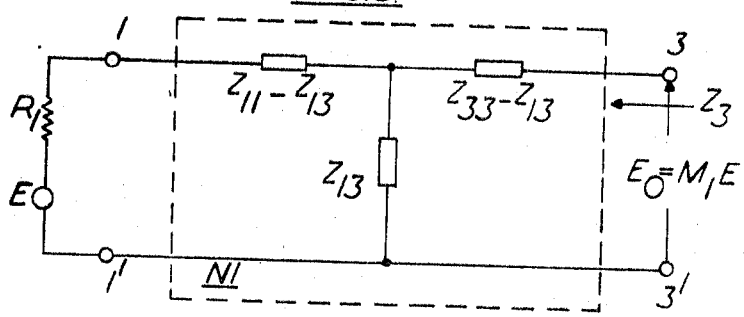
Figure 9:
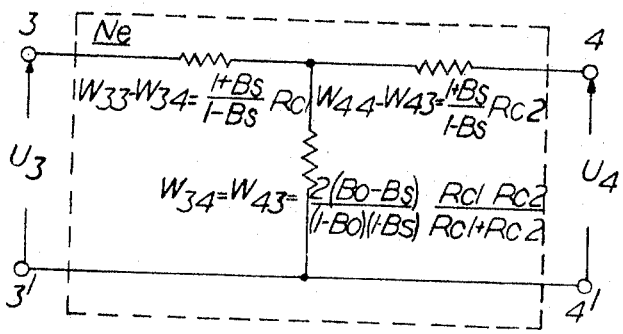
Figure 10:
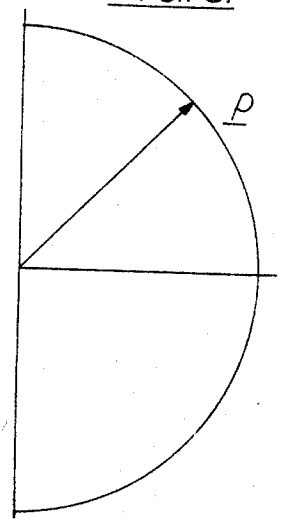
Figure 11:
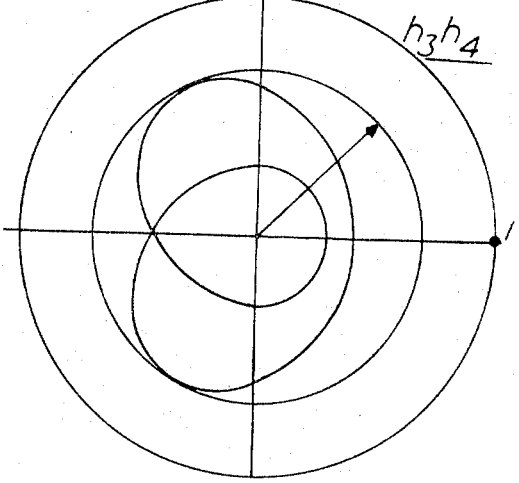

The study of expression (119) in relation to FIGS. 10 and 11 makes it clear that $B_{34}B_{43}$ may exceed unity even if only one of the two filters involved in the communication satisfies the requirement of a minimum non zero value for the resistive component of its pulse impedance at all frequency between zero and half the sampling frequency, i.e., in and out of the passband. This property may be of particular interest in a communication system in accordance with the time division multiplex principle and of the type disclosed in the U.S. Patent No. 3,240,033. In the latter, the subscribers are divided into groups and so are the incoming and outgoing junctions. If amplification is desired only for connections with distant subscribers, then only the junction filters need be realized in accordance with the methods described, whether these filters for the junction be low-pass filters or bandpass filters if the channels are divided in accordance with the frequency division principle on the junctions. In this manner using an interconnecting arrangement as disclosed in this last patent, only a minimum number of common amplification devices each used in accordance with the time division multiplex principle need be provided since such devices may be associated with the junction highways or with the intermediate highways which link a subscriber group highway with either an outgoing junction group highway or an incoming junction group highway. Alternatively, bi-directional junctions may be used. Common amplifiers in the pulse circuits, i.e., associated with the highways may evidently also be used independently of a time division multiplex electronic switching system, merely as a convenient way to secure common amplification in a frequency division carrier system.

While the principles of the invention have been described above in connection with specific apparatus, it is to be clearly understood that this description is made only by way of example and not as a limitation on the scope of the invention.

I claim:

1. A resonant transfer circuit for transferring energy from energy sources to terminating means, said resonant transfer circuit including multiplex amplification means, a plurality of filters cascaded between said energy sources and said terminating means, each of said filters exhibiting substantially constant pulse impedances within their respective passbands, switch means connected between said filters to separate said filters when said switch means are in an unoperated condition, said switch means periodically operated to interconnect said filters at a sampling frequency rate, the cut-off frequencies of said filters being distinct from one-half the said sampling frequency, and compensating means associated with at least one of said filters for pulse impedance compensating said one of said filters whereby the pulse impedance of said compensated filter is substantially purely resistive and constant at frequencies inside and outside of the passband.

2. In the resonant transfer circuit of claim 1 wherein said compensating means comprises compensating filter means, wherein said compensating filter means comprises input terminals and output terminals, means for series connecting said input terminals between said switch means and said one of said filters, and resistance means connected to the said output terminals.

3. The resonant transfer circuit of claim 1 wherein said compensating means comprises compensating filter means, means in said compensating filter means providing said compensating filter means with pulse impedance characteristics that are complementary to the pulse impedance characteristics of said one of said filters.

4. The resonant transfer system of claim 3 characterized in that said compensating filter means has a passband distinct from that of said one filter and uncomplementary with the latter.

5. The resonant transfer circuits of claim 3 wherein the input impedance of said one of said filters comprises a resistance component which decreases gradually from a constant value in the passband of the said one of said filters to zero outside the passband and wherein the input impedance of said compensating filter means comprises a resistance component which decreases gradually from a constant value in the passband of the said compensating filter means to zero outside the passband.

6. The resonant transfer system of claim 3 wherein said compensating filter means comprises antiresonant circuit means, and means for coupling said compensating filter means in series with the open circuit input impedance of said one of said filters.

7. The resonant transfer circuit of claim 3 wherein said one of said filters to be compensated has a bandwidth on either side of said sampling frequency.

8. The resonant transfer circuit of claim 3 wherein said one of said filters to be compensated has a bandwidth on one side of $m$ times the sampling frequency, where $m$ is a positive integer, and wherein means are included in said compensating filter means for providing a substantially complementary bandwidth on one side of an odd multiple of one-half the sampling frequency.

9. The resonant transfer circuit of claim 3 wherein said one of said filters to be compensated has a bandwidth extending symmetrically on both sides of $m$ times said sampling frequency, where $m$ is a positive interger, and wherein said compensating filter means provides a substantially complementary bandwidth located on an odd multiple of one-half the sampling frequency.

10. Resonant transfer circuits as claimed in claim 1 characterized in that the pulse impedance of at least one of said filters exhibits a resistive component outside the passband having a predetermined minimum value.

11. Resonant transfer circuits as claimed in claim 10, characterized in that the passband of said filters does not extend to odd multiples of half the sampling frequency.

12. Resonant transfer circuits as claimed in claim 11, characterized in that said filters offer a capacitive impedance at high frequency on the side of said switches.

13. Resonant transfer circuits as claimed in claim 12 wherein said compensating filter means includes a series branch, said series branch comprising the combination of an antiresonant circuit shunted by a first resistance, and means connecting the said combination in series with a second resistance shunted by a capacitance.

14. Resonant transfer circuits as claim in claim 12 wherein said compensating filter means comprises a two terminal network including a series branch, said series branch including two series capacitances, inductance means shunting one of said capacitances, and a resistance means shunting said two terminal network.

15. Resonant transfer circuits as claimed in claim 12 wherein said filter compensating means includes a series branch on the side of the switches, and wherein said series branch comprises two serially connected capacitances, inductance means shunting one of said capacitances, a first resistor means shunting the other of said capacitances and a second resistance shunting said inductance means.

16. Resonant transfer circuits for transferring pulses over pulse circuits including amplifying means in the pulse circuits, a first and a second filter coupled by said amplifying means, said amplifying means including switches interconnecting said filters at a sampling frequency rate, compensating filter means associated with at least one of said filters, said resonant transfer circuit characterized in this, that a plot of the complex variable $B_{34}B_{43}h_3h_4$ function of the complex frequency variable does not enclose the point 1, where $B_{34}$ and $B_{43}$ represent the ratio between the voltage at the first and second filter inputs respectively, on the side of the said switches used between said filter in the resonant transfer circuit, immediately after the reopening of the pulse connection, and the voltage at the second and first filter inputs respectively, on the side of the said switches immediately before the closure of the pulse connection, and where $h_3$ and $h_4$ represent reflection coefficients between the pulse impedances of said first and second filter input impedances respectively, and first and second resistances respectively, said pulse impedance being defined as the summation of $Z(p+nP)$ over all integral positive and negative values of $n$ where $Z(p)$ is the open circuit input impedance of the corresponding filter on the side of the said switches used in the resonant transfer circuit, $p$ the imaginary angular frequency and $P$ the imaginary angular sampling frequency.

17. Resonant transfer circuits as claimed in claim 16, characterized in that the modulus of either $h_3$ or $h_4$ does not exceed a prescribed predetermined value smaller than unity at frequencies inside and outside of the passband of the filters.

18. Resonant transfer circuits as claimed in claim 17, characterized in that the modulus of $h_3h_4$ does not exceed said predetermined value at all frequencies below half the sampling frequency.

References Cited

UNITED STATES PATENTS 3,303,438   2/1967   Fettweis _____ 333—20 X
3,325,735   6/1967   Fettweis.

FOREIGN PATENTS 221,992   6/1958   Great Britain.

ROBERT L. GRIFFIN, *Primary Examiner.*

B. V. SAFOUREK, *Assistant Examiner.*

U.S. Cl. X.R.

333—70